United States Patent
Li et al.

(10) Patent No.: US 12,249,336 B2
(45) Date of Patent: Mar. 11, 2025

(54) CANONICAL TRAINING FOR HIGHLY CONFIGURABLE MULTILINGUAL SPEECH

(71) Applicants: Microsoft Technology Licensing, LLC, Redmond, WA (US); Jinyu Li, Bellevue, WA (US); Long Zhou, Beijing (CN); Xie Sun, Bellevue, WA (US); Shujie Liu, Beijing (CN)

(72) Inventors: Jinyu Li, Bellevue, WA (US); Long Zhou, Beijing (CN); Xie Sun, Bellevue, WA (US); Shujie Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/573,846

(22) PCT Filed: Jun. 29, 2021

(86) PCT No.: PCT/CN2021/102947
§ 371 (c)(1),
(2) Date: Dec. 22, 2023

(87) PCT Pub. No.: WO2023/272466
PCT Pub. Date: Jan. 5, 2023

(65) Prior Publication Data
US 2024/0265924 A1    Aug. 8, 2024

(51) Int. Cl.
*G10L 15/32*   (2013.01)
*G10L 15/00*   (2013.01)
(Continued)

(52) U.S. Cl.
CPC ............ *G10L 15/32* (2013.01); *G10L 15/005* (2013.01); *G10L 15/063* (2013.01); *G10L 15/30* (2013.01); *G10L 2015/0635* (2013.01)

(58) Field of Classification Search
CPC ..... G10L 15/32; G10L 15/005; G10L 15/063; G10L 15/30; G10L 2015/0635
(Continued)

(56) References Cited

U.S. PATENT DOCUMENTS 9,047,868 B1 *   6/2015   O'Neill ................. G10L 15/197
9,691,384 B1 *   6/2017   Wang ..................... G10L 15/18
(Continued)

FOREIGN PATENT DOCUMENTS

WO   WO-2021179701 A1 *   9/2021   ........... G10L 15/005

OTHER PUBLICATIONS

Anjuli Kannan, et al., Large-Scale Multiligual Speech Recognition with a Streaming End-to-End Model, Article, Sep. 11, 2019, Ithica, NY, US.
(Continued)

*Primary Examiner* — Thuykhanh Le
(74) *Attorney, Agent, or Firm* — Workman Nydegger

(57) ABSTRACT

Embodiments are provided for building a configurable multilingual model. A computing system obtains a plurality of language-specific automatic speech recognition modules and a universal automatic speech recognition module trained on a multi-language training dataset comprising training data corresponding to each of the plurality of different languages. The computing system then compiles the universal automatic speech recognition module with the plurality of language-specific automatic speech recognition modules to generate a configurable multilingual model that is configured to selectively and dynamically utilize a sub-set of the plurality of language-specific automatic speech recognition modules with the universal automatic speech recognition module to process audio content in response to user input identifying one or more target languages associated with the audio content.

20 Claims, 17 Drawing Sheets

(51) Int. Cl.
*G10L 15/06* (2013.01)
*G10L 15/30* (2013.01)

(58) Field of Classification Search
USPC .......................................................... 704/8
See application file for complete search history.

(56) References Cited

U.S. PATENT DOCUMENTS

| | | | | |
|---|---|---|---|---|
| 9,697,821 | B2* | 7/2017 | Rao | G10L 15/063 |
| 10,115,393 | B1* | 10/2018 | Kumar | G10L 15/16 |
| 10,885,918 | B2* | 1/2021 | Hsu | G10L 15/26 |
| 11,302,310 | B1* | 4/2022 | Gandhe | G10L 15/065 |
| 11,551,668 | B1* | 1/2023 | Baevski | G06F 18/2155 |
| 12,073,838 | B1* | 8/2024 | Bobbili | G10L 15/22 |
| 2002/0123891 | A1* | 9/2002 | Epstein | G10L 15/197 |
| | | | | 704/235 |
| 2003/0040907 | A1* | 2/2003 | Chang | G10L 15/32 |
| | | | | 704/231 |
| 2004/0088163 | A1* | 5/2004 | Schalkwyk | G10L 15/187 |
| | | | | 704/E15.02 |
| 2007/0011012 | A1* | 1/2007 | Yurick | G10L 15/26 |
| | | | | 704/277 |
| 2007/0271088 | A1* | 11/2007 | Waibel | G06F 40/263 |
| | | | | 704/9 |
| 2008/0091435 | A1* | 4/2008 | Strope | G10L 15/183 |
| | | | | 704/277 |
| 2008/0162146 | A1* | 7/2008 | Eckert | G10L 15/22 |
| | | | | 704/E15.04 |
| 2013/0110804 | A1* | 5/2013 | Davis | G06F 16/9032 |
| | | | | 707/706 |
| 2014/0046891 | A1* | 2/2014 | Banas | G06N 5/022 |
| | | | | 706/46 |
| 2014/0140497 | A1* | 5/2014 | Ripa | H04M 3/5175 |
| | | | | 379/265.06 |
| 2015/0279360 | A1* | 10/2015 | Mengibar | G06F 40/205 |
| | | | | 704/257 |
| 2015/0379988 | A1* | 12/2015 | Corfield | G10L 15/32 |
| | | | | 704/255 |
| 2016/0104482 | A1* | 4/2016 | Aleksic | G10L 15/1815 |
| | | | | 704/235 |
| 2017/0032035 | A1* | 2/2017 | Gao | G06N 3/08 |
| 2017/0053643 | A1* | 2/2017 | Ben-David | G10L 15/065 |
| 2017/0357632 | A1* | 12/2017 | Pagallo | G06F 3/04886 |
| 2017/0357640 | A1* | 12/2017 | Bellegarda | G06F 40/58 |
| 2018/0089172 | A1* | 3/2018 | Needham | H04L 67/306 |
| 2018/0096683 | A1* | 4/2018 | James | H04L 12/282 |
| 2018/0182386 | A1* | 6/2018 | Lee | G10L 15/22 |
| 2018/0233131 | A1* | 8/2018 | Aleksic | G10L 15/187 |
| 2019/0279613 | A1* | 9/2019 | Wheeler | G10L 15/16 |
| 2019/0341033 | A1* | 11/2019 | Hammons | G06F 3/167 |
| 2019/0378495 | A1* | 12/2019 | Kim | G10L 15/063 |
| 2019/0378497 | A1* | 12/2019 | Lichun | G10L 15/063 |
| 2020/0020319 | A1* | 1/2020 | Malhotra | G10L 15/26 |
| 2020/0160836 | A1* | 5/2020 | Chen | G10L 15/16 |
| 2020/0175961 | A1* | 6/2020 | Thomson | G10L 15/28 |
| 2020/0184953 | A1* | 6/2020 | Yao | G10L 15/32 |
| 2020/0194000 | A1* | 6/2020 | Xian | G06F 40/58 |
| 2020/0211417 | A1* | 7/2020 | Huang | G06F 40/58 |
| 2020/0219492 | A1* | 7/2020 | Apsingekar | G10L 15/197 |
| 2020/0258504 | A1* | 8/2020 | Lee | G10L 15/063 |
| 2020/0380215 | A1* | 12/2020 | Kannan | G10L 15/005 |
| 2021/0027784 | A1* | 1/2021 | Li | G10L 15/26 |
| 2021/0056148 | A1* | 2/2021 | Smit | G06F 16/9538 |
| 2021/0193138 | A1* | 6/2021 | Yu | G10L 15/22 |
| 2021/0225368 | A1* | 7/2021 | Chew | G10L 15/32 |
| 2021/0233510 | A1* | 7/2021 | Datta | G10L 15/063 |
| 2021/0233521 | A1* | 7/2021 | Su | G10L 15/22 |
| 2021/0327431 | A1* | 10/2021 | Stewart | G06V 40/45 |
| 2021/0358486 | A1* | 11/2021 | Lee | G06F 40/279 |
| 2022/0108688 | A1* | 4/2022 | Wang | G06N 3/084 |
| 2022/0148581 | A1* | 5/2022 | Thomas | G06F 18/2148 |
| 2022/0171941 | A1* | 6/2022 | Ouyang | G06F 40/58 |
| 2022/0261631 | A1* | 8/2022 | Cohen | G06N 20/00 |
| 2022/0300719 | A1* | 9/2022 | Raina | G10L 25/24 |
| 2022/0309340 | A1* | 9/2022 | Leal | G06N 3/08 |
| 2022/0310061 | A1* | 9/2022 | Ramabhadran | G06N 3/045 |
| 2022/0310077 | A1* | 9/2022 | Tu | G10L 15/22 |
| 2022/0310081 | A1* | 9/2022 | Gaur | G10L 15/22 |

OTHER PUBLICATIONS

Waters Austin, et al., Leveraging Language ID in Multilingual End-to-End Speech Recognition, Workshop, Dec. 1, 2019, pp. 928-935, Retrieved from the Internet.

Li Bo, et al., Multi-Dialect peech Recognition with a Single Sequence-to-Sequence Model, Conference, Apr. 15, 2018.

International Search Report and Written Opinion Issued in PCT Application No. PCT/CN21/0102947, Mailed Date: Dec. 8, 2021, 13 Pages.

Long, et al., "A Configurable Multilingual Model is All You Need to Recognize All Languages," IEEE International Conference on Acoustics, Speech and Signal Processing (ICASSP), vol. 1, Jul. 13, 2021, pp. 6422-6426.

* cited by examiner

CANONICAL TRAINING FOR HIGHLY CONFIGURABLE MULTILINGUAL SPEECH

BACKGROUND

Automatic speech recognition (ASR) is a deep learning task that allows a machine learning model to recognize speech and generate transcriptions of the recognized speech. Some ASR models are trained for recognizing and transcribing a single language. Conventional methods also focus on training a universal model to support multiple languages without knowing which language the user is speaking or improving the speech recognition by leveraging a single pre-given language ID generated from a language identification system to guide the universal ASR model. Another solution involves building many specialized models for different combinations of languages. However, the development cost is formidable. For example, if users want to have a bilingual and/or trilingual support from a set of ten different languages, the users must build 45 to 120 specialized models.

The foregoing traditional ASR models represent a significant waste of computational expense and storage during speech processing. Accordingly, there is an ongoing need and desire for improved systems, methods, and devices for speech recognition and, particularly, for improved systems, methods, and devices that can be utilized to improve automatic speech recognition in multilingual applications.

The subject matter claimed herein is not limited to embodiments that necessarily solve any particular disadvantages of traditional systems or that operate only in environments such as those described above. Rather, this background is only provided to illustrate one exemplary technology area where some embodiments described herein may be practiced.

BRIEF SUMMARY

Embodiments disclosed herein relate to systems, methods, and devices that are configured to facilitate the automatic speech recognition of multilingual audio content, and, even more particularly, for systems, methods and devices that can be utilized to reduce computational expense and storage during multilingual speech processing.

Disclosed systems are configured to obtain a plurality of language-specific automatic speech recognition modules. Each language-specific automatic speech recognition module of the plurality of language-specific automatic speech recognition modules is trained on a different language-specific training dataset such that each of the plurality of language-specific automatic speech recognition modules is configured to recognize speech in a correspondingly different language of a plurality of different languages. The systems also obtain a universal automatic speech recognition module trained on a multi-language training dataset comprising training data corresponding to each of the plurality of different languages such that the universal automatic speech recognition module is trained to recognize speech in all of the plurality of different languages.

The systems are configured to, subsequently, compile the universal automatic speech recognition module with the plurality of language-specific automatic speech recognition modules to generate a configurable multilingual model that is configured to selectively and dynamically utilize a sub-set of the plurality of language-specific automatic speech recognition modules with the universal automatic speech recognition module to process audio content in response to user input identifying one or more target languages associated with the audio content.

Disclosed systems are also configured to obtain a configurable multilingual model comprising a universal automatic speech recognition module and a plurality of language-specific automatic speech recognition modules. The configurable multilingual model is trained to dynamically select the universal automatic speech recognition module and a sub-set of language-specific automatic speech recognition modules from the plurality of language-specific automatic speech recognition modules to generate a user-specific automatic speech recognition model which is configured to recognize spoken utterances in one or more user-identified languages.

The systems are also configured to receive user input comprising (i) a null value corresponding to the universal automatic speech recognition module or (ii) a language identification vector indicating one or more target languages. Subsequently, the systems select the universal automatic speech recognition module. When the user input comprises the language identification vector, the systems are configured to select the sub-set of language-specific automatic speech recognition modules. Each language-specific automatic speech recognition modules included in the sub-set of language-specific automatic speech recognition modules is trained to recognize spoken utterances in a different language of the one or more target languages.

Some disclosed systems are configured to utilize a configurable multilingual model to generate a user-specific automatic speech recognition model. In such configurations, for example, these systems obtain a user-specific automatic speech recognition model comprising a universal automatic speech recognition module and one or more language-specific automatic speech recognition modules that are trained to recognize spoken utterances in one or more user-identified languages.

The user-specific automatic speech recognition model generated by a configurable multilingual model comprises the universal automatic speech recognition module and a plurality of language-specific automatic speech recognition modules. The one or more language-specific automatic speech recognition modules are selected from the plurality of language-specific automatic speech recognition modules based on the one or more user-identified languages. The systems also apply new speech data associated with a particular user to the user-specific automatic speech recognition model and generate a transcript based on the new speech data applied to the user-specific automatic speech recognition model.

This Summary is provided to introduce a selection of concepts in a simplified form that are further described below in the Detailed Description. This Summary is not intended to exhaustively identify key features or essential features of the claimed subject matter, nor is it intended to be used in limiting the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail with the accompanying drawings in which.

DETAILED DESCRIPTION

Disclosed embodiments are operable to facilitate multilingual automatic speech recognition, in particular, by building a configurable multilingual model that is configurable to generate user-specific automatic speech recognition models and utilizing the user-specific automatic speech recognition models to process new audio data for multilingual users.

The disclosed embodiments provide many technical advantages over existing systems. For example, the configurable multilingual model undergoes a single training process, as opposed to a re-iterative or multi-level training process such that the configurable multilingual model is able to generate different models based on users' choices by extracting language-specific modules together with a universal multilingual model. Thus, a single configurable multilingual model can be deployed to recognize any language combination specified by the users, with a single configurable model. The disclosed configurable multilingual model and the subsequent configured/generated user-specific models described herein can be used to facilitate a significant reduction in word error rates, regardless of which one or more languages are selected by the users to be processed by the model(s), relative to existing systems/models. The configurable multilingual model has also been found to provide improved performance over existing models while performing code-switching tasks.

Additionally, because the universal model is language independent and represents the shared information of all languages used to train the universal model, the configurable multilingual model need only use a very small number of parameters to model the residue for each of the different languages, thus saving on computational expense and storage. Finally, the configurable multilingual model is easily scaled up to any number of languages and/or language combinations as supported by the universal model and plurality of language-specific models from which the configurable multilingual model is built/configured, as described, and enabled by the following disclosure.

Figure 1A:
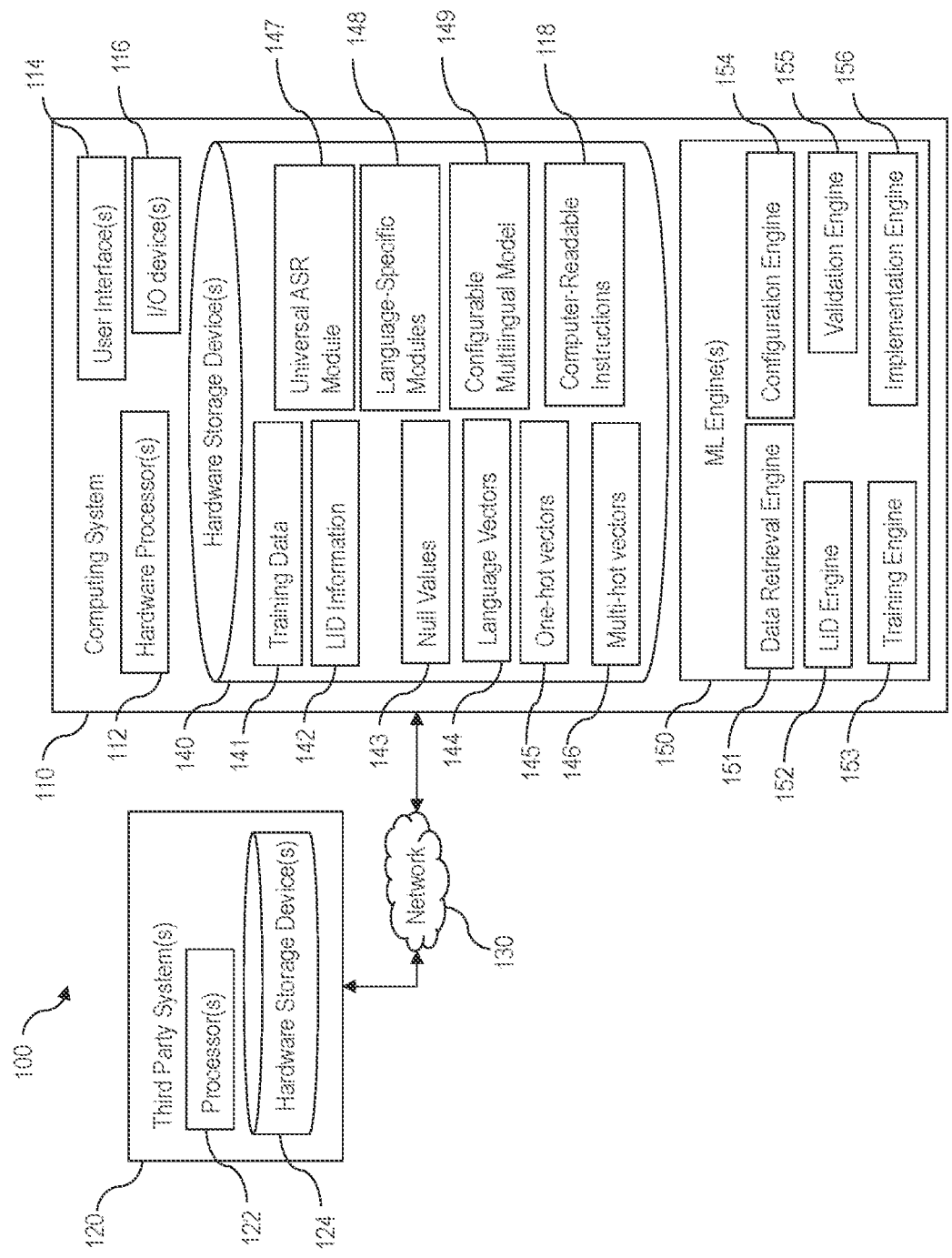
FIG. 1A illustrates an example architecture that includes a computing system that includes and/or that is capable of being utilized to implement the disclosed embodiments.

Attention will be first directed to FIG. 1A, which illustrates the computing system 110 as part of a computing environment 100 that also includes third-party system(s) 120 in communication (via a network 130) with the computing system 110. The computing system 110 is configured to build, train, and configure a configurable multilingual model to generate a user-specific multilingual automatic speech recognition model that is used to process new audio data for multilingual users. The computing system 110 is also configured to operate machine learning models, including the configurable multilingual model and the user-specific models.

The computing system 110, for example, includes one or more processor(s) (such as one or more hardware processor(s)) 112 and a storage (i.e., hardware storage device(s) 140) storing computer-readable instructions 118 wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1A, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different data types including training data 141, LID (language identifier) information 142, null values 143, language vectors 144, one-hot vectors 145, and multi-hot vectors 146, described herein.

The storage (e.g., hardware storage device(s) 140) includes computer-readable instructions 118 for instantiating or executing one or more of the models and/or engines shown in computing system 110 (e.g., universal automatic speech recognition module 147, language-specific modules 148, and/or configurable multilingual model 149). The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-readable instructions 118 corresponding to the computing system 110.

The training data 141 is used for many training purposes, including training a configurable multilingual model 149 from scratch to be able to configure itself to generate a user-specific automatic speech recognition model, training the universal automatic speech recognition module 147 to be able to recognize speech in multiple languages (e.g., an language-independent speech recognition model), and training one or more of the language-specific modules 148 to recognize speech in a particular target language. The training data 141 comprises one or more training datasets. Some training datasets comprise training data for a specific language. Such datasets are usable to train language-specific automatic speech recognition modules. Some training datasets comprise training data for a plurality of languages, and/or a plurality of language combinations. Such datasets, when used to train the universal automatic speech recognition module, are referred to as language-independent training datasets and are usable to train an automatic speech recognition system on a variety of languages, wherein the trained automatic speech recognition system is able to recognize speech utterance in any language included in that variety of languages, as well as extend recognition to new languages based on the previous training. Some language-independent training datasets comprise training data for a variety of languages, but without any labels or annotations labeling the corresponding languages for data included in the dataset. The training data 141 comprises audio data and ground truth transcriptions corresponding to spoken utterances recognized in the audio data.

For example, some training datasets included in training data 141 cover ten languages including English, Spanish, French, Italian, Polish, Portuguese, Netherlands, German, Romanian, and Greek. The training datasets can also include enterprise specific vernacular and terminology. The size of each training dataset for each language varies due to the availability of transcribed data. The training data 141 also comprises test and validation datasets. All the training and test datasets are configured with anonymized data with personally identifiable information removed. Separate validation sets comprising any number of spoken utterances (e.g., 5 k utterances) per language are used for hyperparameter tuning.

Some test (or training) datasets comprise a language combination (e.g., German/English or Spanish/English) that are used during code-switching tasks to evaluate and/or train functionality and effectiveness of the different models to address the code-switching challenge. Code-switching tasks involve automatic speech recognition for audio content that comprises spoken language utterances in two or more languages, where the utterances switch back and forth between the different languages. Some of the referenced training datasets for the configurable multilingual model comprise over seventy-five thousand hours of transcribed enterprise data. Some of these datasets are also configured for a particular speaker or user, a particular combination of speakers/users, for a target enterprise, or a target context.

The LID information 142 comprises language identification information to be used by the configurable multilingual model 149 to generate a user-specific automatic speech recognition model. The LID information 142 comprises one or more user-selected languages. The LID information 142 is extracted from user input, automatically detected from a user profile, and/or from a language identification system. The LID information 142 comprises null values 143 and language vectors 144. A null value is zero value representing a condition where no languages are selected by a user or detected by a language-identification system. When the null value is present, only the universal automatic speech recognition module 147 is included in the user-specific module.

The language vectors 144 are configured as one-hot vectors 145 which are vectors that represent (or vector representations of) a single language being selected (e.g., <1,0,0,0, . . . >, <0,1,0,0, . . . >, etc.) and multi-hot vectors 146 which are vectors that represent (or vector representations of) multiple languages being selected (e.g., <1,1,0,0, . . . >, <0,1,0,1,0 . . . >, etc.). The language vectors 144 are configured as input to the configurable multilingual model 149 to activate one or more language-specific modules 148 to be included in the user-specific model, wherein a non-zero value included in the language vector positively weights (i.e., activates) a language-specific module layer and a zero value unweights a language-specific module layer (i.e., an unweighted or zero-weighted language-specific module is not included in the user-specific model). For one-hot vectors, the universal automatic speech recognition module 147 and one language-specific module of the plurality of language-specific modules 148 are included in the user-specific model. For multi-hot vectors, the universal automatic speech recognition module 147 and a plurality of language-specific modules 148 are included in the user-specific model. The terms "one-hot vector" and "multi-hot vector" should be appreciated by persons skilled in the art to be interpreted as terms of art used in machine learning to indicate one or more states of a model, or in this case different modules of the same model.

An additional storage unit for storing machine learning (ML) Engine(s) 150 is presently shown in FIG. 1A as storing a plurality of machine learning models and/or engines. For example, computing system 110 comprises one or more of the following: a data retrieval engine 151, an LID engine 152, a training engine 153, a configuration engine 154, a validation engine 155, and an implementation engine 156 which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as training data or input audio data (e.g., new audio data/user audio data). The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote systems (e.g., third-party system(s) 120) comprising third-party datasets and/or data sources. In some instances, these data sources comprise visual services that record or stream text, images, and/or video.

The data retrieval engine 151 accesses electronic content comprising simulated audio data, natural audio data, ground truth transcription labels, and/or other types of audio-visual data including video data, image data, holographic data, 3-D image data, etc. The data retrieval engine 151 is configured to retrieve training datasets comprising speech data and corresponding transcriptions for a target domain corresponding to a target enterprise, a target speaking context, or a particular target user. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired audio data processing techniques.

The data retrieval engine 151 locates, selects, and/or stores raw recorded source data such that the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the training engine 153 and/or implementation engine 156.

The LID engine 152 (i.e., the language identification engine) is configured to retrieve and generate language identification information/data, including the language identification vectors. The LID engine 152 accesses a user profile database comprising a plurality of user profiles, each user profile comprising a pre-selected set of preferred language and automatically generates the language identification vector for each user profile, wherein the one or more target languages is the pre-selected set of preferred languages. The LID engine 152 also is configured to detect a user identity, and automatically retrieves the language identification vector corresponding to the user identity to be included in the user input. Alternatively, or additionally, the LID engine is configured to present an interface configured to receive any user input that identifies a particular combination of languages that the configurable multilingual model should be configured to recognize. The user input is interpretable by the interface as either (i) the null value corresponding to no language being identified from the user input, or alternatively, (ii) the language identification vector corresponding to the particular combination of languages.

The training engine 153 is in communication with one or more of the data retrieval engine 151, LID engine 152, configuration engine 154, validation engine 155, and/or the implementation engine 156. In such embodiments, the training engine 153 is configured to receive one or more sets of training data 141 from the data retrieval engine 151 and language identification data (e.g., language vectors 144) from the LID engine 152. After receiving training data relevant to a particular application or task, the training engine 153 trains one or more models on the training data. The training engine 153 is configured to train a model via unsupervised training and/or supervised training. The training engine 153 is configured to train the universal automatic speech recognition module 147 on training data for a plurality of languages, each language-specific automatic speech recognition module on training data for a different language, and the configurable multilingual module on training data that configures the model to generate a user-specific model.

Disclosed embodiments cover many different strategies for training the configurable multilingual model 149. In one strategy, the configurable multilingual model 149 is trained from scratch. In another strategy, the universal automatic speech recognition module 147 is trained using the training data without user choice vector (e.g., the language identification vectors) before being included as part of the configurable multilingual model 149. Then, the training engine 153 trains each language-specific automatic speech recognition module using training data with a user choice vector before being included in the configurable multilingual model 149. The training engine 153 is also configured to fine-tune the pre-trained models. To reduce memory consumption, the language-specific linear layer is only applied to the top and bottom layers instead of all the encoder network layers (e.g., only a portion of the configurable multilingual model layers are trained) such that each language-specific module does not need as many parameters as the universal module. This facilitates a scaling up of the models to any number of languages.

A key factor in training the configurable multilingual model is simulating the combination of languages that user selects. For each training sample, the system generates the user choice multi-hot vector (e.g., language identification vector indicating a plurality of user-selected languages) by randomly setting several elements together with the ground truth element as "1" (e.g., positive weighting), and setting other elements as "0" (e.g., null, zero-weighting, or un-weighting). In this manner, the configurable multilingual model is informed that the current training sample comes from one of the several languages set by the user choice vector. During training, the system simulates each combination of languages supported by the user choice vector. The configurable multilingual model is trained to be configured at inference time (e.g., run-time) to recognize any language combination based on user selection.

Configuration engine 154 is configured to facilitate the configuration of the configurable multilingual model at inference time when a language identification vector is received. The user-specific model is output that is formulated as the weighted combination of the of the output from the universal automatic speech recognition module and the outputs from all language-specific modules. A language-specific module is weighted positively if it corresponds to a language indicated in the language identification vector. A language-specific module is zero-weighted or unweighted if it corresponds to a language not included in the language-identification vector. Thus, the configuration engine 154 configures the configurable multilingual model 149 as different models based on user selection of different combinations of languages.

The validation engine 155 uses separate validation training datasets to validate the model. The validation engine 155 is also configured as a test engine, wherein the configurable multilingual model is first trained, and then tested on a separate test dataset under different tasks.

The computing system 110 includes an implementation engine 156 in communication with any one of the models and/or ML engine(s) 150 (or all of the models/engines) included in the computing system 110 such that the implementation engine 156 is configured to implement, initiate or run one or more functions of the plurality of ML engine(s) 150. In one example, the implementation engine 156 is configured to operate the data retrieval engines 151 so that the data retrieval engine 151 retrieves data at the appropriate time to be able to generate training data for the training engine 153. The implementation engine 156 facilitates the process communication and timing of communication between one or more of the ML engine(s) 150 and is configured to implement and operate a machine learning model (or one or more of the ML engine(s) 150).

The computing system is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases housing data that could be used as training data, for example, audio data not included in local storage. Additionally, or alternatively, the third-party system(s) 120 include machine learning systems external to the computing system 110. The third-party system(s) 120 are software programs or applications.

Figure 1B:
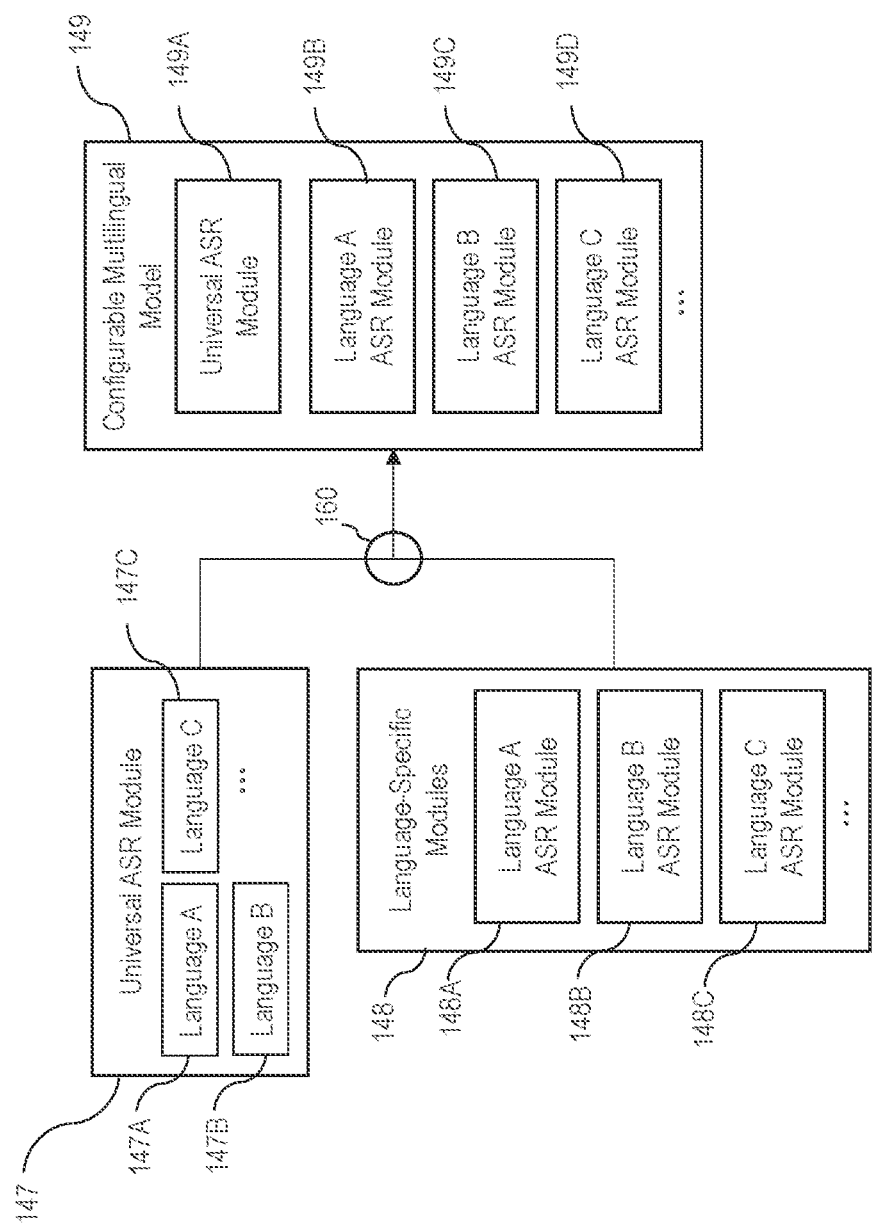
FIG. 1B illustrates an example embodiment for compiling a configurable multilingual model.

Attention will now be directed to FIG. 1B, with similar reference numerals as FIG. 1A, which illustrates an example embodiment for building the configurable multilingual model 149, as referred to as a canonical automatic speech recognition model. As shown in FIG. 1B, a computing system obtains a universal automatic speech recognition module 147 being trained to support automatic speech recognition for any number of languages (e.g., Language A (language 147A), Language B (language 147B), Language C (language 147C), and/or other languages).

As described herein, the computing system is configured to obtain a plurality of language-specific modules 148 (e.g., Language A ASR (module 148A), Language B ASR (module 148B), Language C ASR (module 148C), and/or other language-specific modules). As described above, each language-specific module is trained to recognize speech is a particular language. For example, Language A ASR module is trained on a training dataset corresponding to Language A (e.g., Language A 147A); Language B ASR (module 148B) is trained on a training dataset corresponding to Language B (e.g., Language B (language 147B)); and Language C ASR (module 148C) is trained on a training dataset corresponding to Language C (e.g., Language C (language 147C)).

For every language supported by the universal automatic speech recognition module 147, the computing system obtains/accesses a language-specific module that supports each language. The computing system then compiles (e.g., compilation 160) the universal automatic speech recognition module and the language-specific modules 148 to generate a configurable multilingual model 149 that now comprises a universal automatic speech recognition module 149A, a Language A ASR (Module 149B), a Language B ASR (Module 149C), a Language C ASR (Module 149D), and/or other language-specific modules.

As a result of the compiling, the configurable multilingual model 149 comprises a language-specific embedding based on the multi-hot vector and an input acoustic feature, a language-specific layer comprising the universal automatic speech recognition module 147, and the plurality of language-specific modules 148. The language-specific embedding is created by processing the one-hot vector and the input acoustic feature. In one example, the language-specific embedding is built from combining the multi-hot vector and at least an input acoustic feature into values that comprise the language-specific embedding. The input acoustic feature is extracted from audio data included in the input user audio and/or input training data. The configurable multilingual model 149 also comprises a language-specific vocabulary that merges one or more language-specific vocabulary dataset(s) in response to user input interpretable for selecting one or more languages, wherein each language corresponds to a different language-specific vocabulary dataset. Each language-specific vocabulary dataset comprises vocabulary data such as vocabular words or phrases in a specific language. Language-vocabulary datasets also comprise other phonemes or tokens that are common in a particular language and are usable to identify a particular language. In such configurations, each language-specific module is associated with a language-specific vocabulary that aids the language-specific module in recognizing particular vocabulary phrases, words, tokens, and/or phonemes as part of automatic speech recognition tasks. Thus, the vocabulary datasets are applicable to the language-specific modules as training data, or as input during implementation of the configurable multilingual model (or user-specific model) during speech recognition tasks.

It should be appreciated that the configurable multilingual model 149 is configurable as many different types of models. One example machine learning model is the RNN-Transducer (RNN-T) model which has been very promising in the end-to-end (E2E) network models. These replace the traditional hybrid models. The RNN-T model comprises an encoder network, a prediction network, and a joint network. The encoder network converts an acoustic feature into a high-level representation. The prediction network produces a high-level representation by conditioning on the previous non-blank target output prediction by the RNN-T model. The joint network is a feed-forward network that combines the encoder network output and the prediction network output to generate a further output which is used to calculate a SoftMax output. In other configurations, a Transformer-Transducer (T-T) model is used with replaces the LSTM layers with a Transformer in the encoder of the Transducer with significant gain. Such alternative configurations are beneficial, for example, to help mitigate latency and computational costs of the standalone T-T while maintaining high recognition accuracy.

The configurable multilingual model 149 is trained to support multilingual speech recognition. Through the shared learning of model parameters across multiple languages, the configurable multilingual model 149 performs better than monolingual models, particularly for those languages with less data. The configurable multilingual model 149 also significantly eases the process of user-specific model deployment and resource management by supporting any number (n) languages with a single ASR model rather than n number of individual models. The configurable multilingual model 149 is an effective streaming end-to-end multilingual ASR system, which predicts a distribution over the next output based on previous acoustic features and a target sequence.

Attention will now be directed to FIGS. 2A-2D which illustrates various example embodiments for configuring a configurable multilingual model 214 (e.g., configurable multilingual model 149 of FIGS. 1A-1B) to generate a user-specific model 224 based on user input 202 comprises LID information 204. Directing now to FIG. 2A, the LID information 204 is configured as null value 206 (e.g., null values 143) or as a language identification vector 208 (e.g., language vectors 144). The language identification vector 208 is configurable as a one-hot vector 210 (e.g., one-hot vectors 145) or a multi-hot vector 212 (e.g., multi-hot vectors 146). The configurable multilingual model 214 comprises a universal automatic speech recognition module 216 (e.g., universal automatic speech recognition module 149A) and a plurality of language-specific automatic speech recognition modules including Language A ASR (module 218) (e.g., Language A ASR (module 149B)), Language B ASR (module 220) (e.g., Language B ASR (module 149C)), Language C ASR (module 222) (e.g., Language C ASR (module 149D)), and/or other language-specific modules. In some instances, these language-specific modules are operational in performing automatic speech recognition tasks only when combined with a universal automatic speech recognition module. Alternatively, one or more of the language-specific modules are functional, in some instances, as stand-alone modules configured to perform automatic speech recognition independent of the automatic speech recognition module.

By leveraging LID information 204, the configurable multilingual model 214 is able to outperform a universal automatic speech recognition that does not support language identification information. The configurable multilingual model 214 is configured to support a user who pre-selects multiple languages to be supported by the user-specific model 224, instead of just identifying one pre-selected language. One way to leverage language identification information is to have the computing system append the language identification vector 208 to an input layer of the encoder network of the configurable multilingual model 214.

Figure 2A:
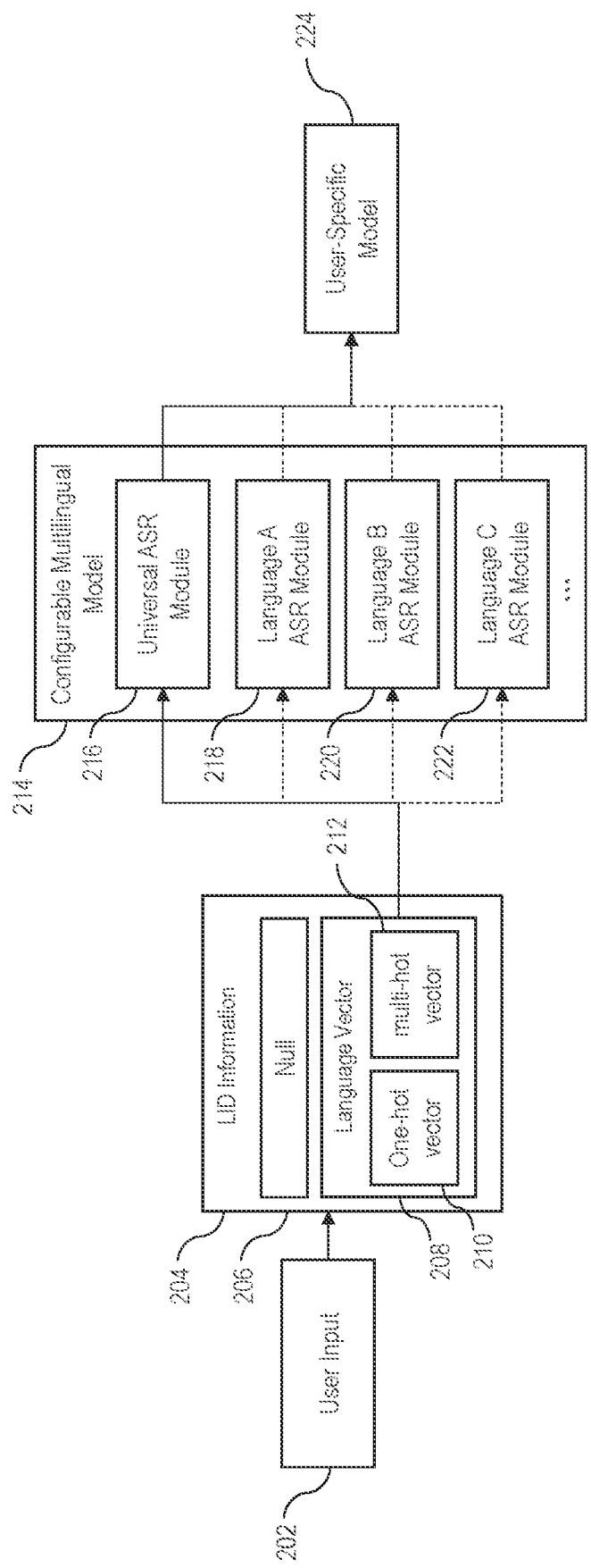
FIG. 2A illustrates an example embodiment of a process flow diagram for generating a user-specific model.
Figure 2B:
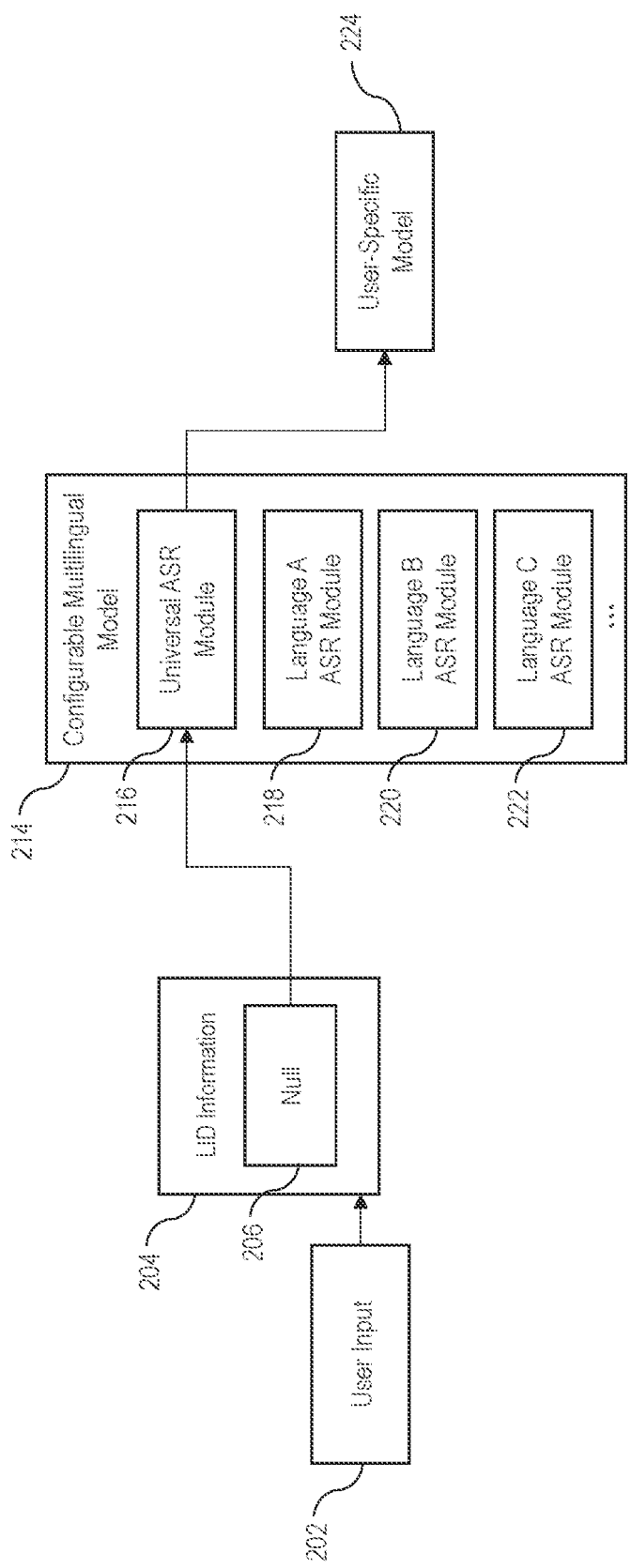
FIG. 2B illustrates an example embodiment of a process flow diagram for generating a user-specific model when the LID information comprises a null value.

Attention will now be directed to FIG. 2B, which illustrates an example embodiment of configuring the configurable multilingual model 214 when the user input 202 comprises LID information 204 that is a null value 206. When the LID information 204 comprises a null value 206, it means that the user did not pre-select any preferred languages, or rather that the language identification vector is a null vector. Thus, in those cases, only the universal automatic speech recognition module 216 is positively weighted and then included as part of the user-specific model 224. No language-specific modules are included in the user-specific model 224. Alternatively, all of the language-specific modules are included in the user-specific model 224 along with the universal automatic speech recognition module 216.

Figure 2C:
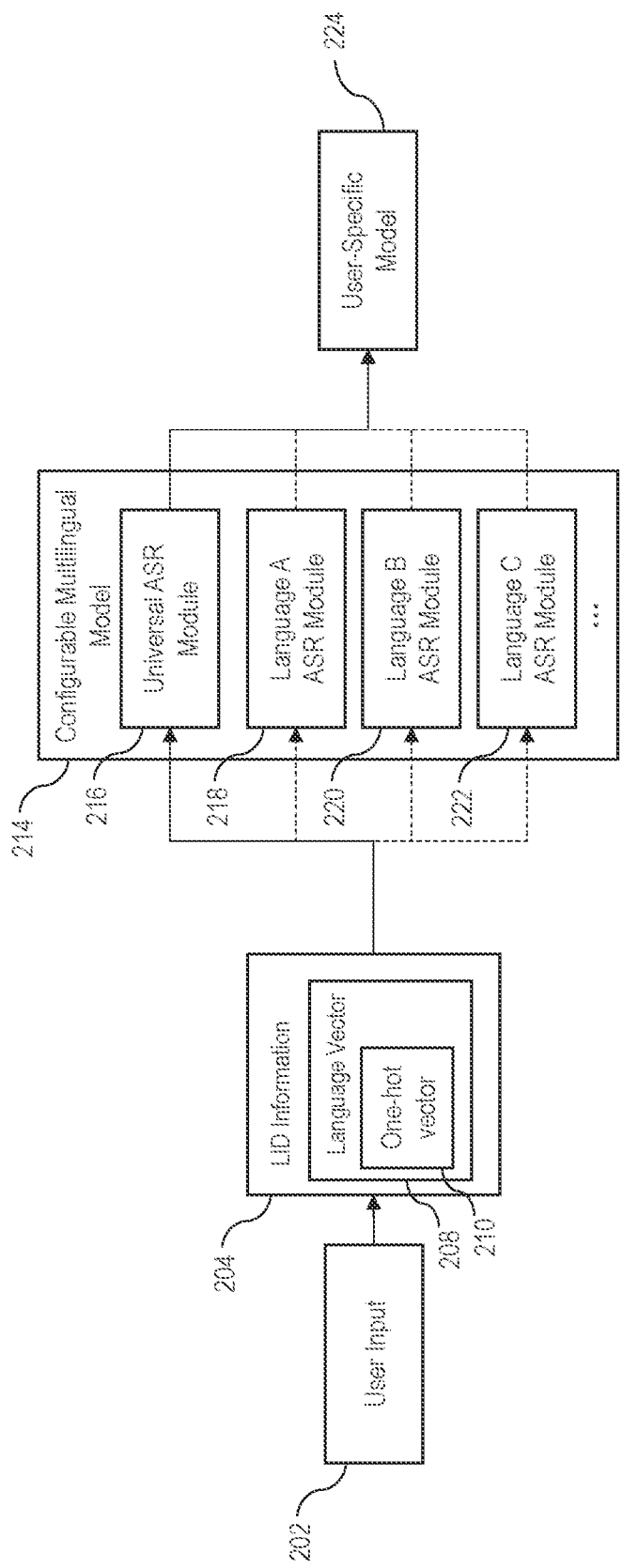
FIG. 2C illustrates an example embodiment of a process flow diagram for generating a user-specific model when the LID information comprises a one-hot vector.

Attention will now be directed to FIG. 2C, which illustrates an example embodiment for configuring the configurable multilingual model 214 when the LID information 204 comprises a language identification vector 208 that is a one-hot vector 210. The one-hot vector 210 represents the user input 202 indicating a single language. When the one-hot vector is received as input to the configurable multilingual model, the computing system configures the configurable multilingual model 214 as a user-specific model 224 that includes the universal automatic speech recognition module 216 and selects the language-specific module that corresponds to the language indicated by the one-hot vector 210. For example, when the one-hot vector 210 corresponds to Language A, the Language A ASR (module 218) is selected. When the one-hot vector 210 corresponds to Language B, the Language B ASR (module 220) is selected. When the one-hot vector 210 corresponds to Language C, the Language C ASR (module 222) is selected to be included in the user-specific model 224. Any one language-specific module included in the configurable multilingual model 214 is selectable to be included in the user-specific model 224 based on the user input 202/LID information 204.

Figure 2D:
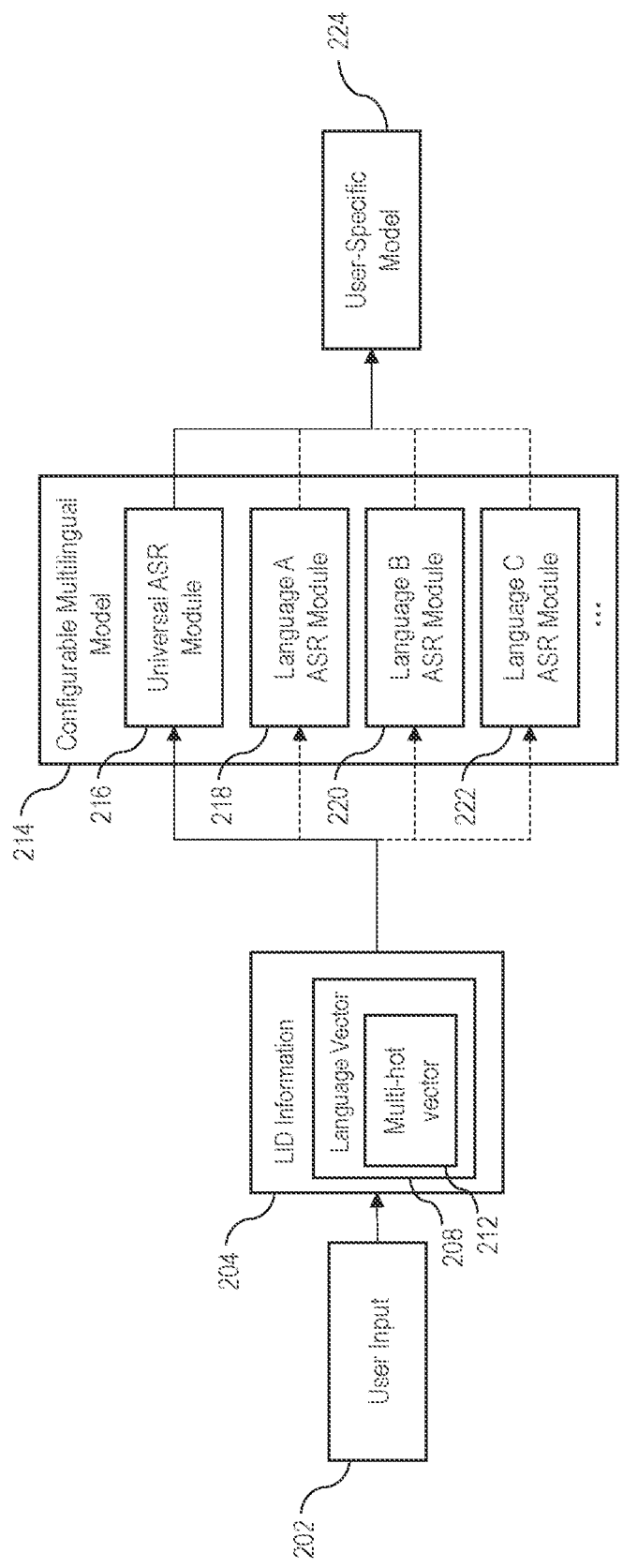
FIG. 2D illustrates an example embodiment of a process flow diagram for generating a user-specific model when the LID information comprises a multi-hot vector.

Attention will now be directed to FIG. 2D, which illustrates an example embodiment for configuring the configurable multilingual model 214 when the user input 202 comprises LID information 204 for a language identification vector 208 that is a multi-hot vector 212. When the LID information 204 included in the user input 202 is a multi-hot vector 212, multiple languages (i.e., a combination of languages) are selected by the user. The computing system then activates the universal automatic speech recognition module 216 and a plurality of language-specific modules to be included in the user-specific model 224. For example, when the multi-hot vector 212 corresponds to Language A and Language B, the user-specific model 224 comprises the universal automatic speech recognition module 216, the Language A ASR (module 218), and the Language B ASR (module 220).

When the multi-hot vector corresponds to Language A and Language C, the user-specific model 224 comprises the universal automatic speech recognition module 216, the Language A ASR (module 218), and the Language C ASR (module 222). When the multi-hot vector 212 corresponds to Language A, Language B, and Language C, the computing system activates the universal automatic speech recognition module 216, Language A ASR (module 218), Language B ASR (module 220), and Language C ASR (module 222). It should be appreciated that any number of languages can be indicated by a multi-hot vector 212, wherein each language-specific module that corresponds to a language indicated by the multi-hot vector 212 is activated and included in the user-specific model 224.

Figure 3:
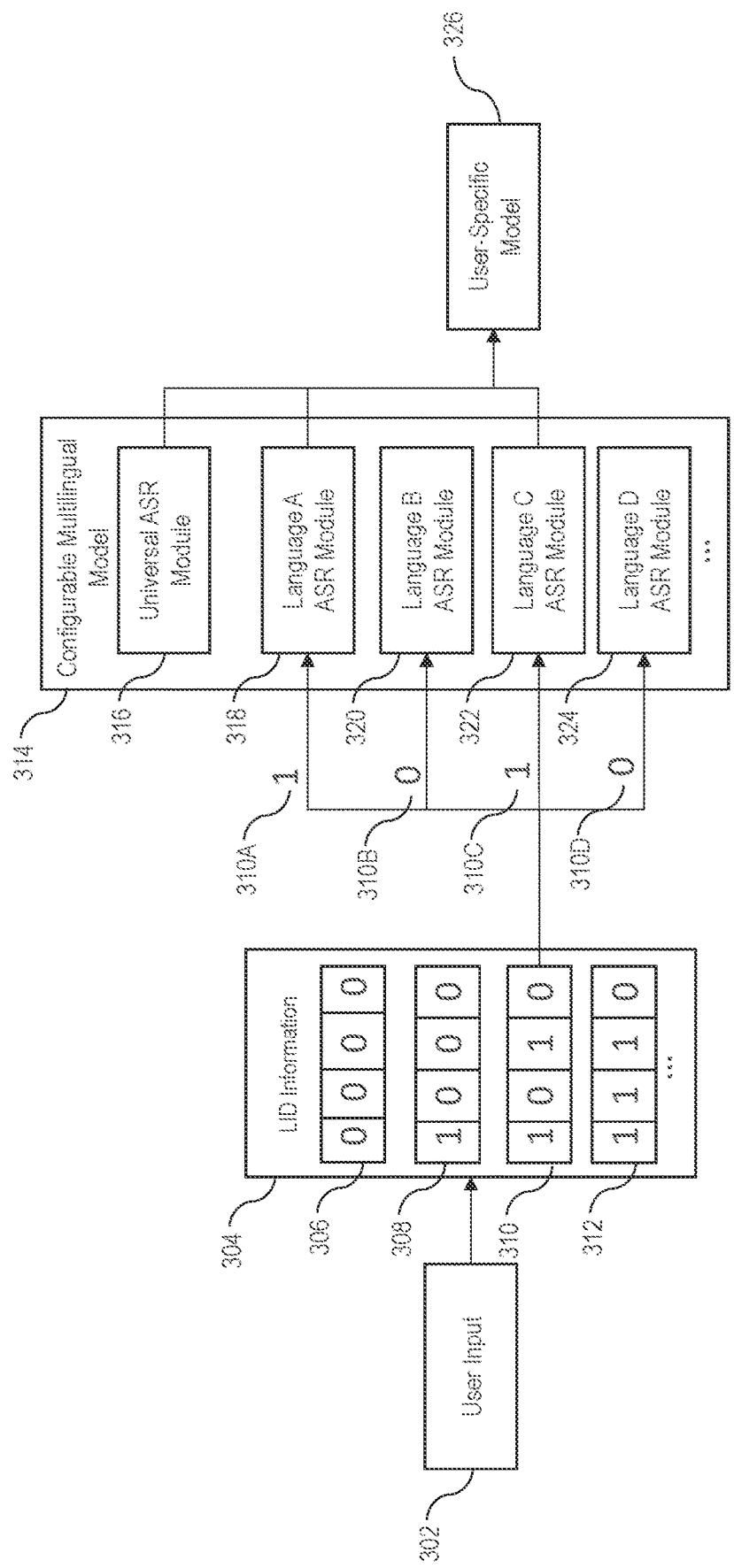
FIG. 3 illustrates another example embodiment of a process flow diagram for generating a user-specific model when the LID information comprises a multi-hot vector.

Attention will now be directed to FIG. 3, which illustrates another example embodiment for configuring a configurable multilingual model 314 when the user input 302 comprises LID information 304 that is configured as a multi-hot vector (e.g., vector 306, vector 308, vector 310, and/or vector 312). The one or more vectors included in the LID information 304 are language identification vectors (e.g., language identification vector 208) which comprises a series of binary code which when applied to the configurable multilingual model 314 weight or unweight one or more of the modules included in the configurable multilingual model 314.

To cover all the possible combinations of languages supported by the configurable multilingual model 314, the configurable multilingual model 314 employs a language-specific embedding, a language-specific layer, and a language-specific vocabulary to achieve the highly configurable goal. The multi-hot vector (e.g., vector 306, vector 308, vector 310, and/or vector 312) is used as a user choice vector to represent languages selected by the user and concatenate it with an input acoustic feature to building a language-specific embedding. For example, [0,0,0,0] vector 306 is a null vector (e.g., null value 206) that activates only the universal automatic speech recognition module 216.

In another example, vector 308 ([1,0,0,0]) is configured as a one-hot vector selecting the universal automatic speech recognition module 316 and Language A ASR (module 318). Vector 310 ([1,0,1,0]) is a multi-hot vector that selects Language A ASR (module 318) via bit 310A (1), and Language C ASR (module 320) via bit 310C (1) along with the universal automatic speech recognition module 316. Language B ASR (module 320) is unweighted via bit 310B (0), and Language D ASR (module 324) is unweighted via bit 310D (0) included in Vector 310. Vector 312 ([1,1,1,0]) that is configured to select the universal automatic speech recognition module 316 along with Language A ASR (module 318), Language B ASR (module 320), and Language C ASR (module 322)).

To further enhance the model ability to distinguish different languages, a language-specific layer is used in the encoder network or prediction network. At a certain layer of the encoder network of the configurable multilingual model 314, the universal automatic speech recognition module and every language-specific module are embedded. A layer input is passed into every module to generate an output. Because the universal automatic speech recognition module 316 is activated, each language-specific module uses fewer parameters to model a particular language to the shared information of all languages.

The weight applied to each of the universal automatic speech recognition module 316 and/or each of the language-specific automatic speech recognition modules determined by the language vector. The language-specific layer prompts the system to further break down the contribution of the language-specific layer into the contribution from the encoder network and the prediction network.

Each language-specific module is further applied into the output of the prediction network. Formally, by utilizing a feed-forward network, the joint network combines the encoder network output and the prediction network output. When deploying the user-specific model 326, the computing system extracts out the corresponding language-specific modules together with the universal module per the user choice vector. Additionally, given the vocabulary of each language and the total vocabulary, the vocabularies corresponding to the language identification vector are merged to a temporary vocabulary at inference time. In theory, the temporary vocabulary is smaller than the total vocabulary, which can be used to avoid the generation of unexpected tokens from other languages. Although the configurable multilingual model 314, without a language-specific vocabulary input, obtains a similar word error rate as the model with the vocabulary input, employing the language-specific vocabulary can avoid outputting the unexpected token(s) of languages not selected by the users, thereby improving the user experience.

Figure 4:
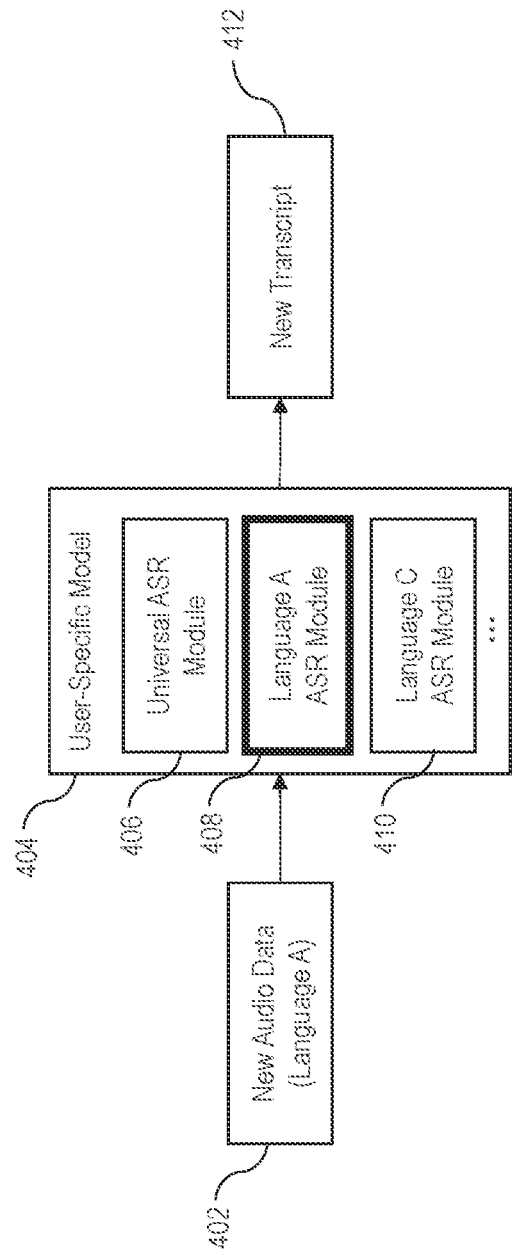
FIG. 4 illustrates an example embodiment of a process flow diagram for utilizing a user-specific model to generate a new transcript based on input audio data.

Attention will now be directed to FIG. 4, which illustrates an example embodiment for processing new audio data 402 with a user-specific model 404 (e.g., user-specific model 224 or user-specific model 326) to generate a new transcript 412. As shown in FIG. 4, new audio data 402 comprises one or more spoken language utterances in Language A. After the user-specific model 404 has been configured from the configurable multilingual model according to disclosed embodiments herein, the new audio data 402 is then applied to the user-specific model 404. The user-specific model 404 shown in FIG. 4 comprises a Universal ASR (module 406) (e.g., universal automatic speech recognition module 316), Language A ASR (module 408) and Language C ASR (module 410). The system recognizes the utterances spoken in Language A, whereby the user-specific model 404 outputs a transcription (e.g., new transcript 412) of the spoken utterances included in the new audio data 402.

Figure 5:
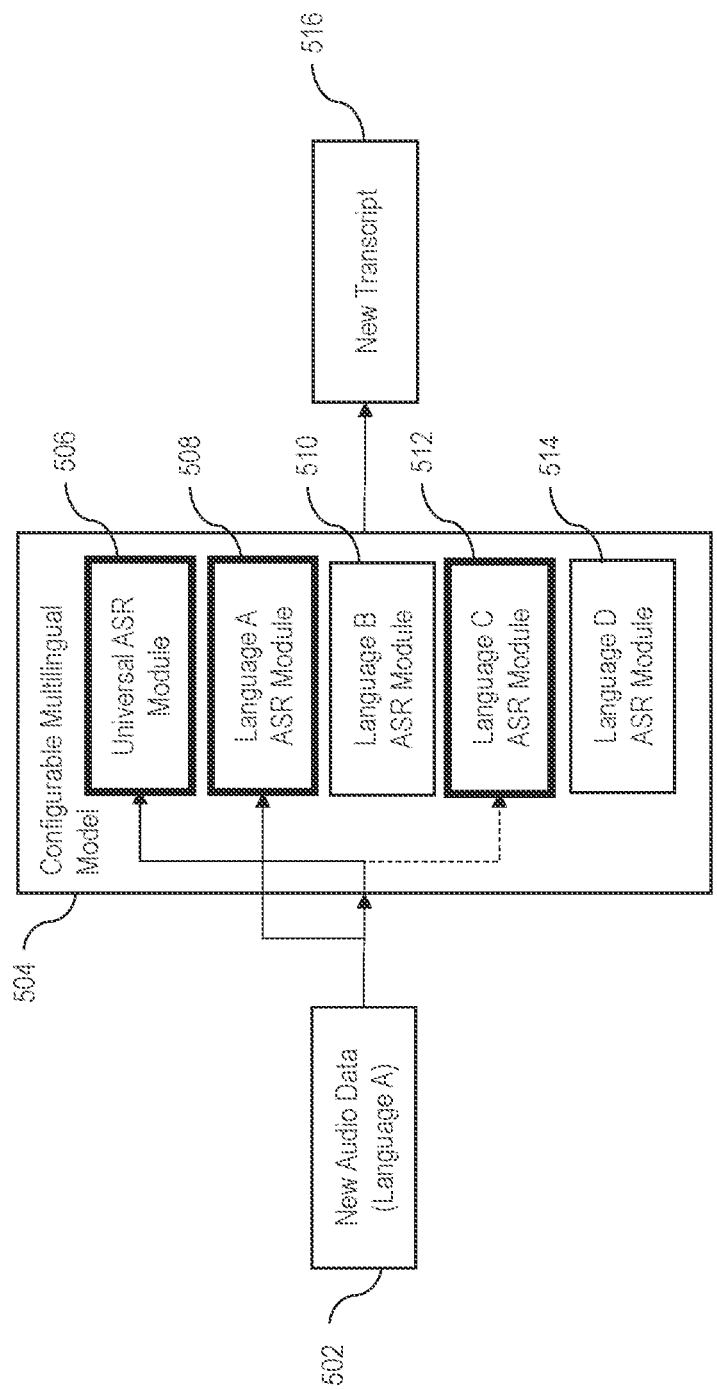
FIG. 5 illustrates an example embodiment of a process flow diagram for utilizing a configurable multilingual model to generate a new transcript based on input audio data.

Attention will now be directed to FIG. 5, which illustrates an example embodiment for processing new audio data 502 using a configurable multilingual model 504 to generate a new transcript 516. FIG. 5 shows an alternate depiction of the generation of the new transcript using a configurable multilingual model 504 that is configured as a user-specific model (e.g., user-specific model 404). For example, after applying a multi-hot vector indicating Languages A and C (not shown), the system activates the universal automatic speech recognition module 506, Language A ASR (module 508), and Language C ASR (module 512) as shown in FIG. 5. The Language B ASR (module 510) and Language D ASR (module 514) are not selected. The spoken language utterances recognized in the new audio data 502 in Language A are then processed into a transcription (e.g., new transcript 516).

Figure 6:
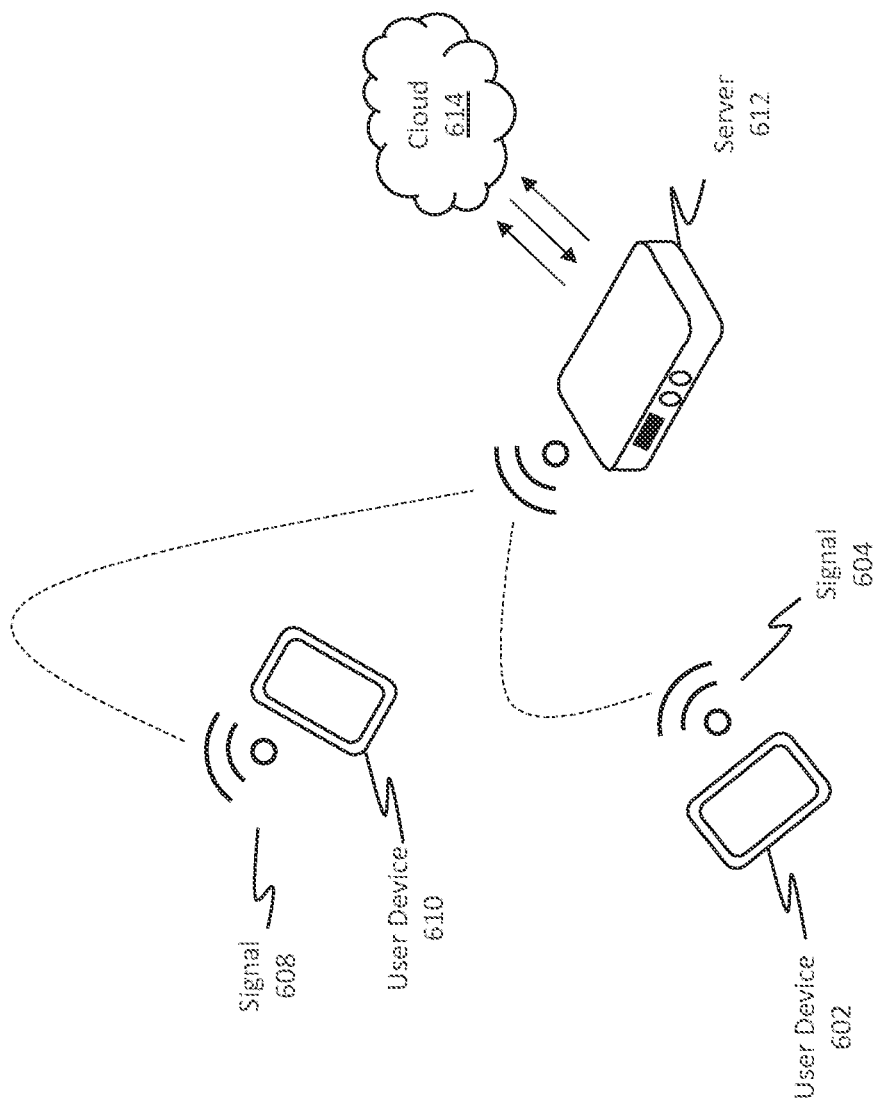
FIG. 6 illustrates an example embodiment of a computing environment in which a server configured to perform the disclosed systems and methods is in communication with one or more user devices that are also configured to perform the disclosed systems and methods.

Attention will now be directed to FIG. 6, which illustrates an example computing environment comprising a server 612 that is configurable to be in communication with a cloud network 614. The server 612 can be backed up on the cloud network 614. The server 612 is also in communication with one or more user devices, including user device 610 and user device 602. User device 610 is in communication with server 612 via signal 608, and user device 602 is in communication with server 612 via signal 604. Each of the user devices are configured to send and receive network communications/requests to/from the server 612. Either the user device and/or the server are able to download instructions, data, or models from one another.

Figure 7:
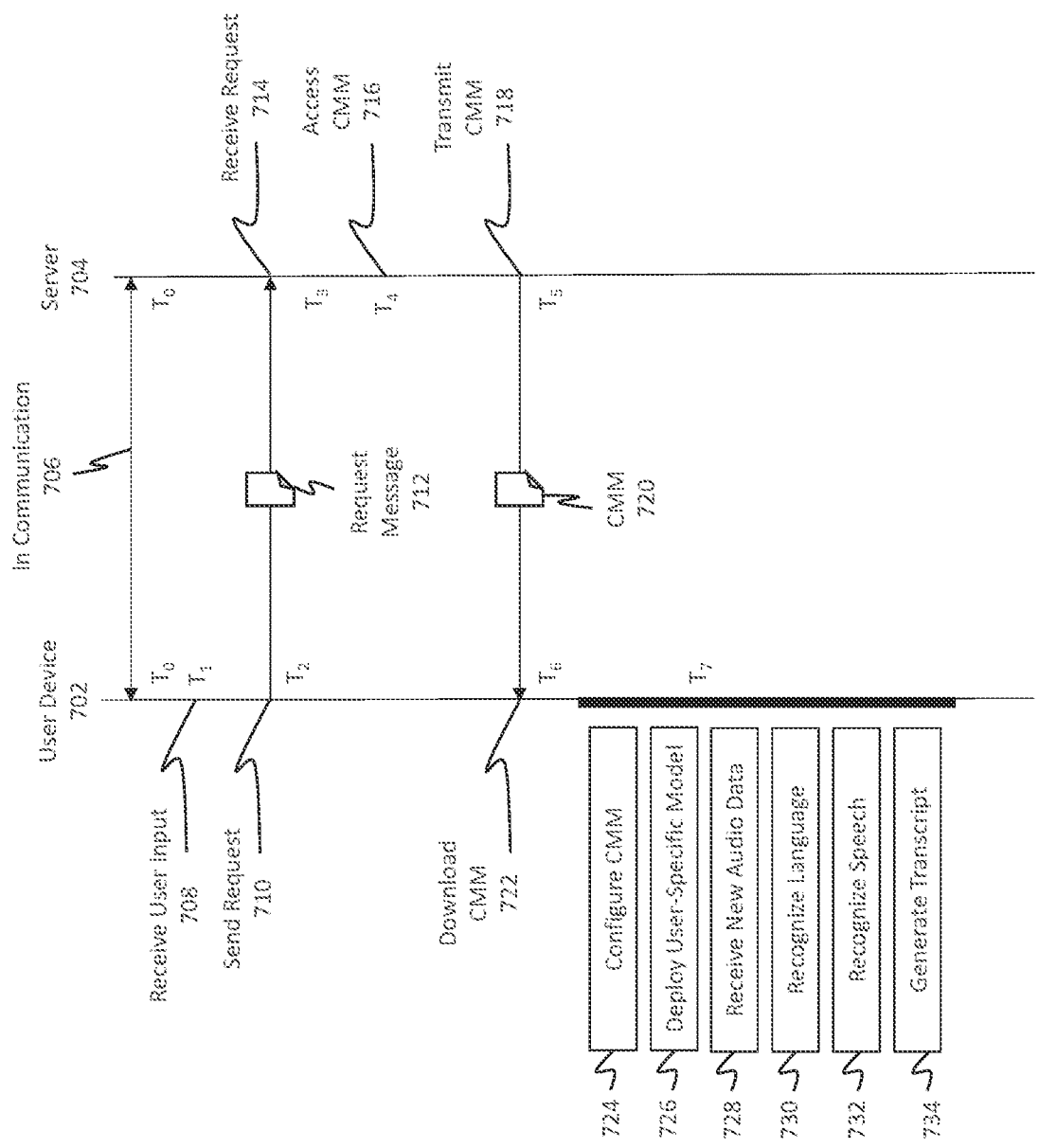
FIG. 7 illustrates an example of a process flow diagram of network communications transmitted and received between a client device and a server for generating and using user-specific model from a configurable multilingual model.

Attention will now be directed to FIGS. 7-10, which illustrate various embodiments for building and configuring a configurable multilingual model via communication between a user device and a server. It should be appreciated that while different acts are performed on the different user devices and servers, all the acts associated with disclosed systems and methods are performable solely on a user device, solely on a server, or on a more segmented or distributed network than that shown in FIG. 6 or FIGS. 7-10. Referring first to FIG. 7, a user device 702 is in communication 706 with server 704. The user device 702 receives user input (act 708), generates a request, and then sends the request (act 710) to the server 704. The server 704 receives the message request 712 (i.e., receive request, act 714).

In response to receiving the request, the system accesses a configurable multilingual model (CMM) (act 716) that has been compiled and stored via methods and systems described herein. The server 704 then transmits the CMM (act 720) (e.g., transmit CMM (act 718)). The user device 702 downloads the CMM (e.g., download CMM, act 722), along with instructions to configure the CMM. After downloading the CMM, the user device 702 then performs a series of acts including to configure the CMM (act 724) and deploying a user-specific model (act 726). The user device 702 can then receive new audio data (act 728), recognize the language (act 730), recognize speech (i.e., spoken language utterances) (act 732), and finally generate a transcript (act 734) for the utterances included in the new audio data.

Figure 8:
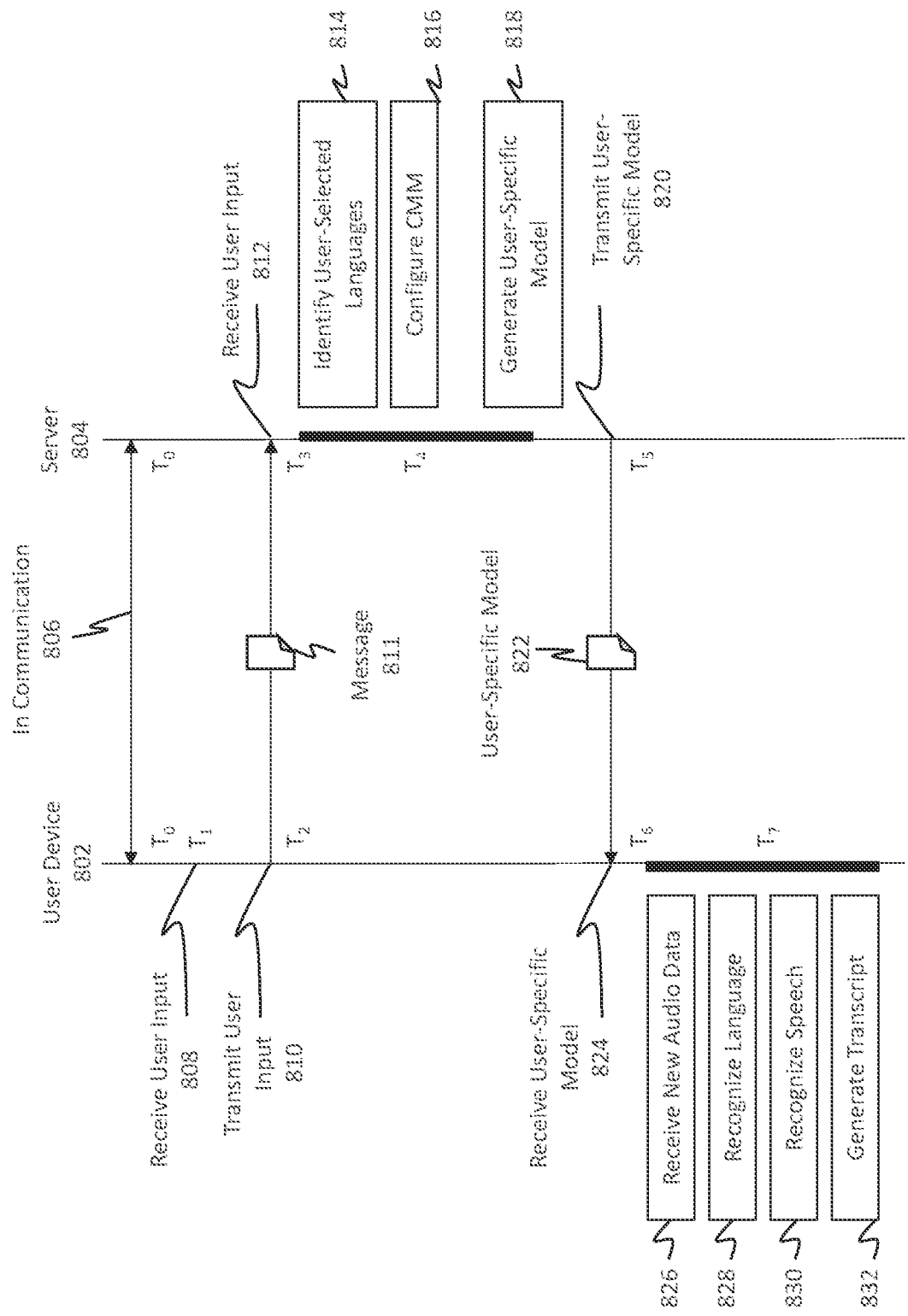
FIG. 8 illustrates another example of a process flow diagram of network communications transmitted and received between a client device and a server for generating and using a user-specific model from a configurable multilingual model.

Attention will now be directed to FIG. 8, which shows a user device 802 in communication 806 with server 804. The user device is configured to receive user input (act 808) and transmit the user input (act 810) to the serve via message 811. The server is configured to receive the user input (act 812) and perform a series of acts in response to receiving the user input.

As shown, the server 804 identifies user-selected languages (act 814) based on the user input (which includes a null value or language identification vector) and configures a CMM (act 816) stored thereon to generate a user-specific model (act 818). The server 804 then is configured to transmit the user-specific model 822 (act 820) to the user device 802 which is configured to receive the user-specific model (act 824). In response to receiving the user-specific model, the user device 802 is configured to perform a series of acts, including using the user-specific model to process new speech data. For example, the user device 802 receives new audio data (act 826), recognizes a particular language (act 828), recognizes spoken language utterances included in the new audio data (act 830), and finally generates a new transcription of the recognized spoken language utterances (act 832).

Figure 9:
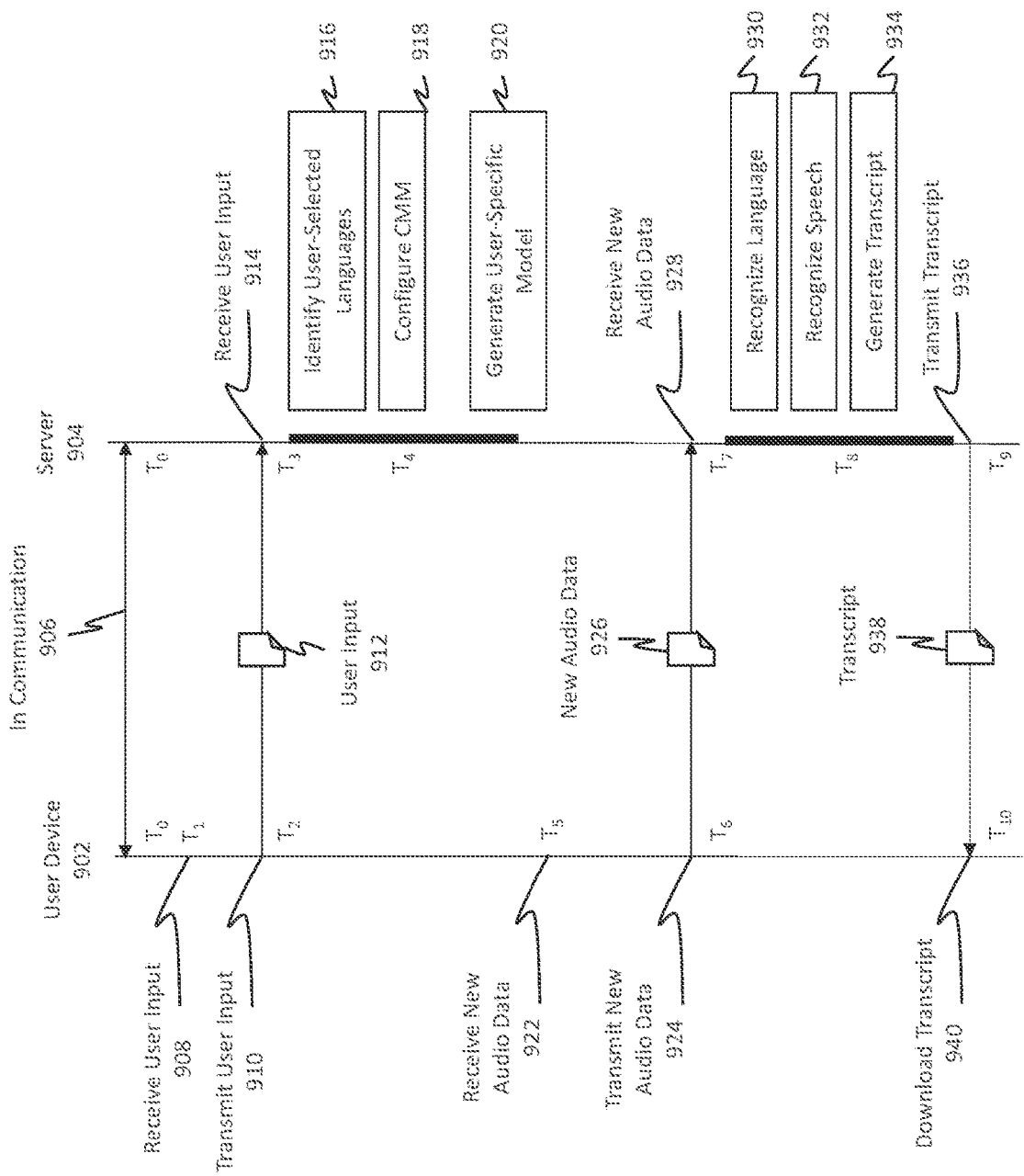
FIG. 9 illustrates another example of a process flow diagram of network communications transmitted and received between a client device and a server for generating and using a user-specific model from a configurable multilingual model.

Attention will now be directed to FIG. 9, which illustrates a user device 902 in communication 906 with server 904. The user device 902 is configured to receive user input (act 908) and transmit the user input 912 (act 910) to the server which is configured to receive the user input (act 914). In response to receiving user input, the server 904 is configured to perform a series of acts, including identifying user-selected languages (act 916) based on a LID information included in the user input 912. The system then configures the CMM (act 918) to be able to recognize spoken language utterances according to the one or more languages selected by the user. A user-specific model is then generated from the CMM (act 920).

The user device 902 is also configured to receive new audio data 926 for a particular user (act 922) and transmit the new audio data to the server 904 (act 924). After the CMM is configured and/or the user-specific model is generated, the server 904 is configured to receive new audio data (act 928). In response to receiving new audio data, the server 904 is configured to perform one or more acts, such as recognizing a particular language associated with the new audio data (act 930), recognizing speech (i.e., utterances) in the new audio data 926 (act 932), and generate a transcription of the speech recognized in the new audio data 926 (act 934). Subsequent to generating the transcript, the server 904 is configured to transmit the transcript 938 (act 936) to the user device which is configured to receive or download the transcript 938 (act 940).

Figure 10:
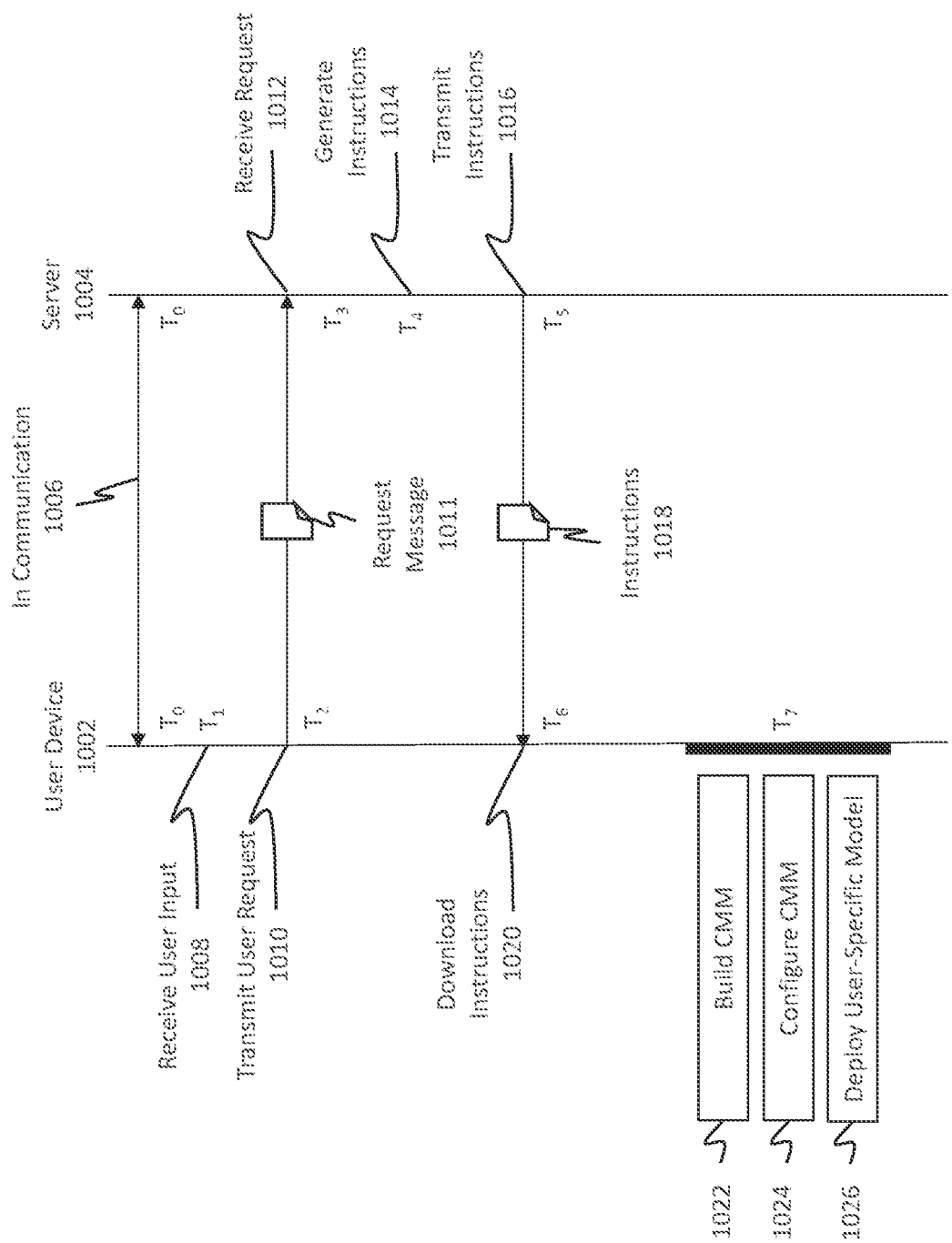
FIG. 10 illustrates another example of a process flow diagram of network communications transmitted and received between a client device and a server for generating a user-specific model from a configurable multilingual model.

Attention will now be directed to FIG. 10, which illustrates a user device 1002 in communication 1006 with a server 1004. User device 1002 is configured to receive user input (act 1008) and transmit the user request (e.g., request message 1011) (act 1010) to the server 1004 which is configured to receive the request message 1011 (act 1012). In response to receiving the request (act 1012), the server 1004 is configured to generate instructions (act 1014) for building a CMM and configuring the CMM to generate and deploy a user-specific model 1026 on a device (e.g., user device 1002). The server 1004 is configured to transmit the computer-readable instructions or computer-executable instructions (e.g., instructions 1018) to the user device 1002 (act 1016), which is configured to download the instructions (act 1020). After obtaining instructions 1018, the user device 1002 is configured to perform one or more acts according to the instructions 1018. For example, the user device 1002 is then able to build a CMM (act 1022), configure the CMM (act 1024), and/or deploy a user-specific model 1026 using the configured CMM.

In summary, FIGS. 7-10 illustrates various examples of methods and systems for building a configurable multilingual model and using it to generate a user-specific model that is capable of recognizing speech for multiple user-selected languages.

Figure 11:
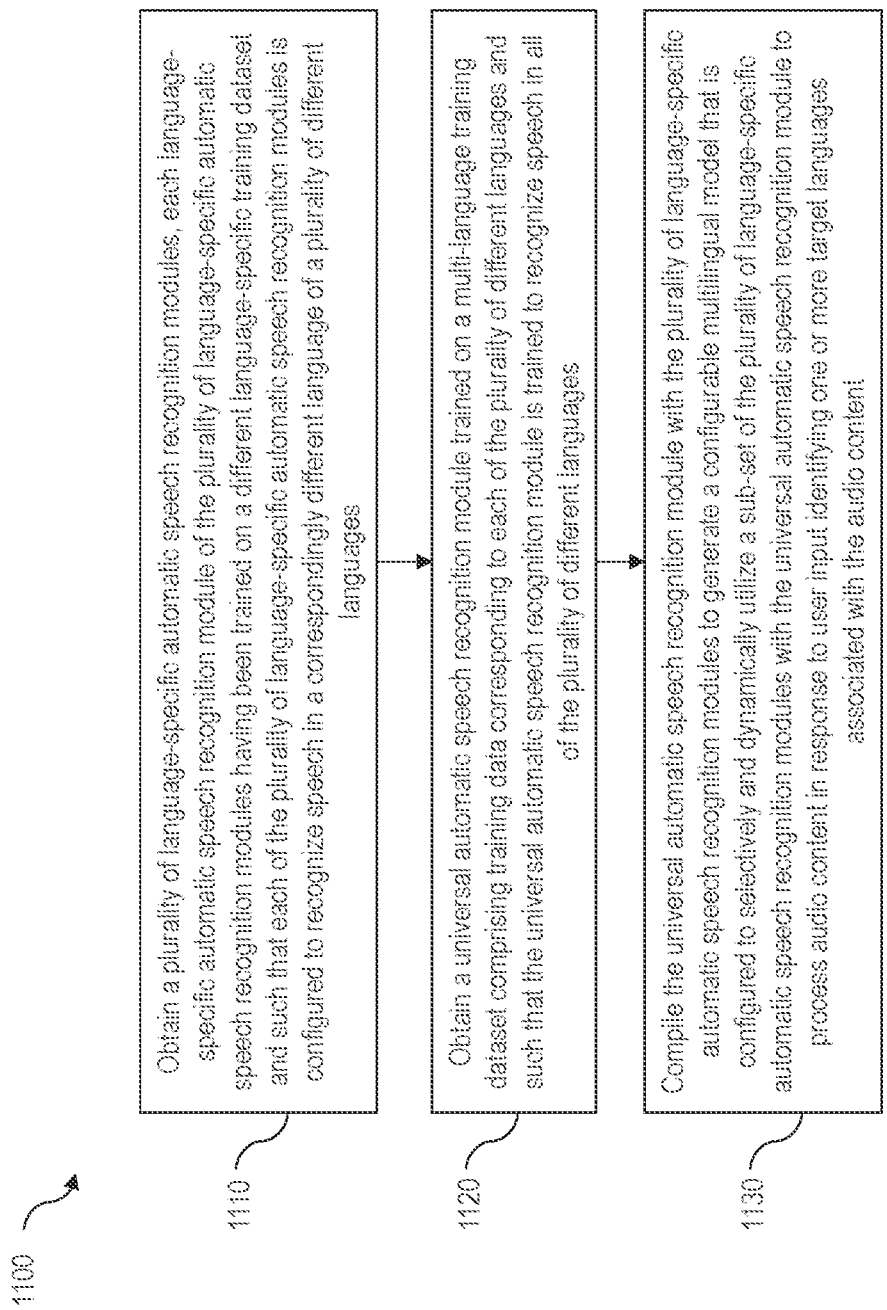
FIG. 11 illustrates an example embodiment of a flow diagram having a plurality of acts for building a configurable multilingual model.
Figure 12:
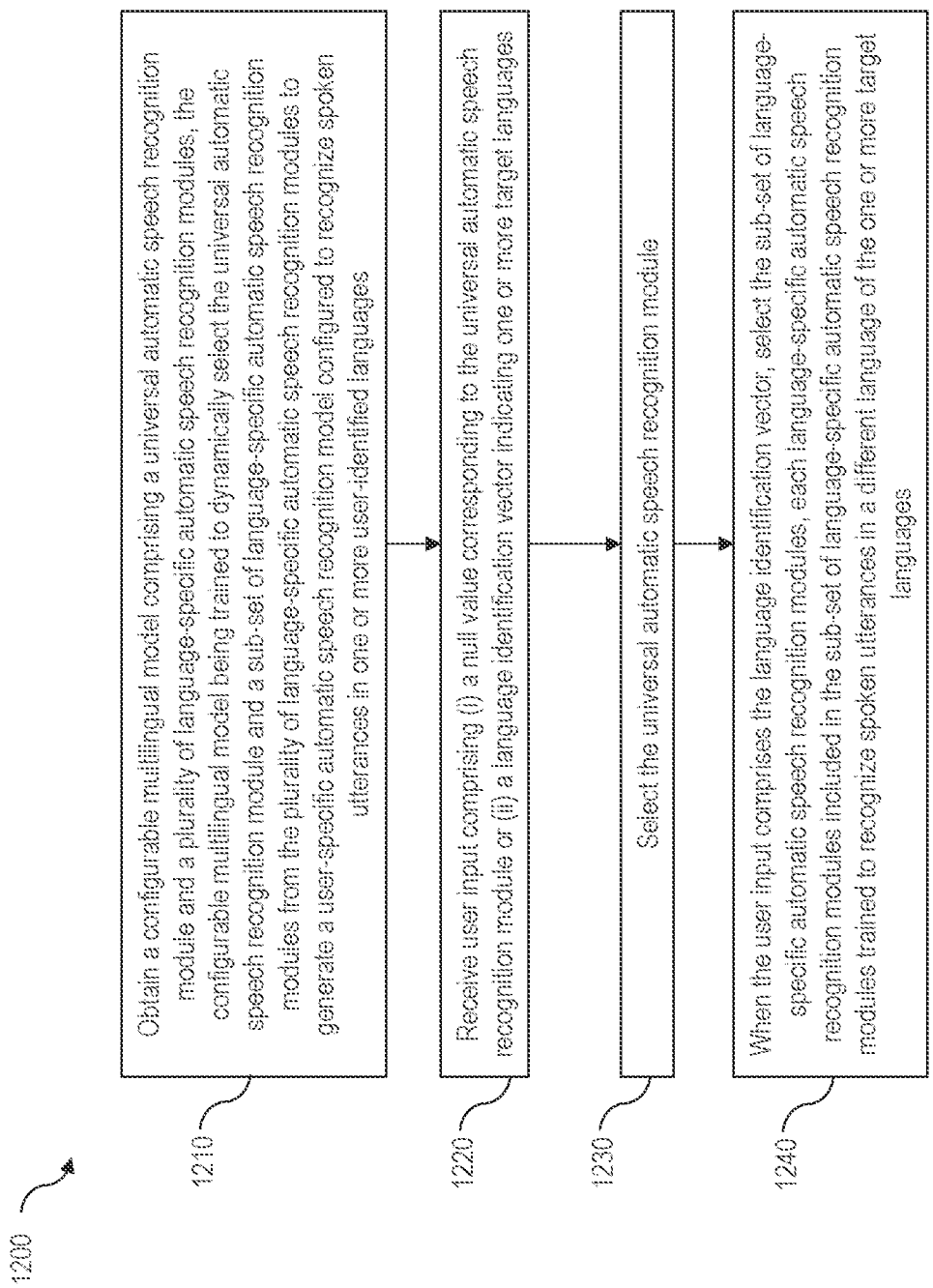
FIG. 12 illustrates an example embodiment of a flow diagram having a plurality of acts for configuring a configurable multilingual model to generate a user-specific ASR model.
Figure 13:
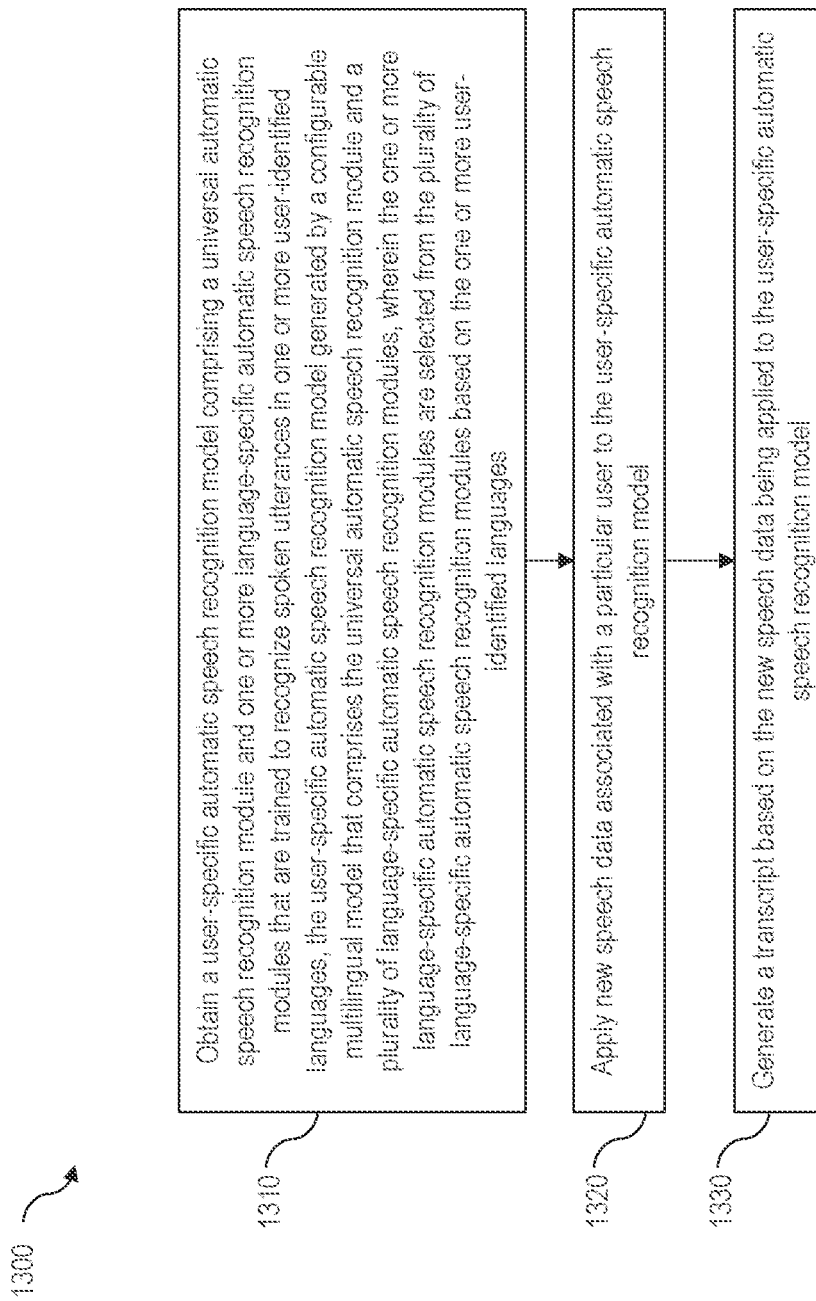
FIG. 13 illustrates an example embodiment of a flow diagram having a plurality of acts for using a user-specific ASR model to process new user audio data.

Attention will now be directed to FIGS. 11-13, which illustrate example embodiments of flow diagrams including a plurality of acts associated with methods and systems disclosed herein. Attention will first be directed to FIG. 11, in some reference to FIG. 1A-1B) which illustrates a flow diagram 1100 that includes various acts (act 1110, act 1120, and act 1130) associated with exemplary methods that can be implemented by computing system 110 for building, training, and refining a machine learning model for performing multilingual speech recognition.

The computing system obtains a plurality of language-specific automatic speech recognition modules (e.g., language-specific modules 148) (act 1110). Each language-specific automatic speech recognition module of the plurality of language-specific automatic speech recognition modules is trained on a different language-specific training dataset such that each of the plurality of language-specific automatic speech recognition modules is configured to recognize speech in a correspondingly different language of a plurality of different languages. The computing system also obtains a universal automatic speech recognition module (e.g., universal automatic speech recognition module 147) trained on a multi-language training dataset comprising training data corresponding to each of the plurality of different languages (act 1120). The universal automatic speech recognition module is trained to recognize speech in all of the plurality of different languages.

Subsequently, the computing system compiles the universal automatic speech recognition module with the plurality of language-specific automatic speech recognition modules to generate a configurable multilingual model (e.g., configurable multilingual model 149) (act 1130). The configurable multilingual model is configured to selectively and dynamically utilize a sub-set of the plurality of language-specific automatic speech recognition modules with the universal automatic speech recognition module to process audio content in response to user input identifying one or more target languages associated with the audio content. For example, in response to receiving user input, the computing system configures the configurable multilingual model at run-time (i.e., in real-time, at inference time, etc.) to dynamically select the sub-set of the plurality of language-specific automatic speech recognition modules based on the user input identifying one or more user languages that the user would like the user-specific automatic speech recognition model to recognize), In this regard, the term "dynamically" is used in reference to the computing systems (or machine learning models) that are updated dynamically in response to user input (e.g., the configurable multilingual model is configurable to dynamically generate a plurality of different user-specific models based on different user input). The term "selectively" refers to the selection of certain modules, from a set of language modules that can be selected from, based on their attributes, as desired, during compilation and/or implementation of the different models (e.g., the configurable multilingual model and/or the user-specific model are configured by selectively utilizing certain selected language modules when compiling the configurable multilingual and user-specified modules).

The one or more computer-readable instructions are further executable to further configure the computing system to train and refine the configurable multilingual model by obtaining a one-hot vector (e.g., one-hot vectors 145) corresponding to a first language and a multi-hot vector (e.g., multi-hot vectors 146) corresponding to the first language and one or more additional languages. The computing system is the configured to apply a training dataset (e.g., training data 141) comprising (i) one or more spoken utterances in the first language and (ii) language identification data (e.g., language vectors 144) and randomly present the one-hot vector and the multi-hot vector to the configurable multilingual model to obtain a one-hot vector output and a multi-hot vector output.

Finally, the computing system is configured to refine the configurable multilingual model by aligning the one-hot vector output to the multi-hot vector output such that the configurable multilingual model generates an equivalent output for both the one-hot vector and the multi-hot vector when new speech data comprising one or more speech utterances spoken in the first language is applied to the configurable multilingual model.

Prior to applying the training dataset comprising (i) one or more speech utterances spoken in the first language and (ii) language identification information, the computing system additionally or alternatively applies a language-independent training dataset without language identification data.

As a result of compiling the configurable multilingual model, the configurable multilingual model comprises a language-specific embedding built from concatenating the multi-hot vector with an input acoustic feature, a language-specific layer comprising the universal automatic speech recognition module and the plurality of language-specific automatic speech recognition modules, and a language-specific vocabulary that merges one or more language-specific vocabulary dataset(s) in response to user input interpretable for selecting one or more languages, each language corresponding to a different language-specific vocabulary dataset.

Attention will now be directed to FIG. 12, in some reference to FIGS. 2A-2D, which illustrates a flow diagram 1200 that includes various acts (act 1210, act 1220, act 1230, and act 1240) associated with exemplary methods that can be implemented by computing system 110 for configuring a configurable multilingual model to generate a user-specific automatic speech recognition model. The computing system obtains a configurable multilingual model (e.g., configurable multilingual model 214) comprising a universal automatic speech recognition module (e.g., universal automatic speech recognition module 216) and a plurality of language-specific automatic speech recognition modules (e.g., Language A ASR (module 218), Language B ASR (module 220), Language C ASR (module 222), and/or other language-specific automatic speech recognition modules) (act 1210). The configurable multilingual model is trained to dynamically select the universal automatic speech recognition module and a sub-set of language-specific automatic speech recognition modules from the plurality of language-specific automatic speech recognition modules to generate a user-specific automatic speech recognition model (e.g., user-specific model 224) configured to recognize spoken utterances in one or more user-identified languages.

The computing system also receives user input (e.g., user input 202) comprising (i) a null value (e.g., null value 206) corresponding to the universal automatic speech recognition module or (ii) a language identification vector (e.g., language identification vector 208) indicating one or more target languages (act 1220) and automatically selects the universal automatic speech recognition module (act 1230). When the user input comprises the language identification vector, the computing system selects the sub-set of language-specific automatic speech recognition modules (act 1240). Each language-specific automatic speech recognition modules included in the sub-set of language-specific automatic speech recognition modules is trained to recognize spoken utterances in a different language of the one or more target languages.

One or more computer-readable instructions are further executable to further configure the computing system to extract the universal automatic speech recognition module and the sub-set of language-specific automatic speech recognition modules from the configurable multilingual model, and at inference time and generate the user-specific automatic speech recognition model by combining the universal automatic speech recognition module and the sub-set of language-specific automatic speech recognition modules. Subsequently, the computing system is configured to transmit the user-specific automatic speech recognition model to a user device (e.g., transmit user-specific model, act 820 of FIG. 8).

The configurable multilingual model is compiled by identifying one or more module languages, obtaining one or more language-specific automatic speech recognition modules, each language-specific automatic speech recognition module of the one or more language-specific automatic speech recognition modules trained on a different language-specific training dataset(s) to train each language-specific automatic speech recognition module to recognize spoken utterances in a different language of the one or more module languages, obtaining a universal automatic speech recognition module trained on a multi-language training dataset comprising training data corresponding to each of the one or more module languages to train the universal automatic speech recognition module to recognize spoken utterances in any of the one or more module languages, and combining the universal automatic speech recognition module and the one or more language-specific automatic speech recognition modules.

The language identification vector comprises either a null vector, a one-hot vector (e.g., one-hot vector 210) corresponding to a single target language, or a multi-hot vector (e.g., multi-hot vector 212) corresponding to a plurality of target languages. The language identification vectors are used by the computing system to select the sub-set of language-specific recognition modules by positively weighting each language-specific automatic speech recognition module included in the sub-set of language-specific automatic speech recognition modules and unweighting each language-specific automatic speech recognition module not included in the sub-set of language-specific automatic speech recognition modules.

When the user input comprises the null value, the computing system is configured to unweight each language-specific automatic speech recognition module included in the plurality of language-specific automatic speech recognition modules such that the sub-set of language-specific automatic speech recognition modules is an empty sub-set.

The computing system is also configured to generate a set of executable instructions (e.g., instructions 1018 of FIG. 10) configured to be transmitted to and executed by a client computing system to cause the client computing system to compile the configurable multilingual model by obtaining a plurality of language-specific automatic speech recognition modules, each language-specific automatic speech recognition module of the plurality of language-specific automatic speech recognition modules having been trained on a different language-specific training dataset and such that each of the plurality of language-specific automatic speech recognition modules is configured to recognize speech in a correspondingly different language of a plurality of different languages.

In order to compile (i.e., build) the configurable multilingual model, the computing system is also configured to obtain a universal automatic speech recognition module trained on a multi-language training dataset comprising training data corresponding to each of the plurality of different languages and such that the universal automatic speech recognition module is trained to recognize speech in all of the plurality of different languages, and then compile the universal automatic speech recognition module with the plurality of language-specific automatic speech recognition modules to generate a configurable multilingual model that is configured to selectively and dynamically utilize a sub-set of the plurality of language-specific automatic speech recognition modules with the universal automatic speech recognition module to process audio content in response to user input identifying one or more target languages associated with the audio content.

The computing system is also configured to obtain the user input automatically or through a user interface. For example, one or more computer-readable instructions are further executable to further configure the computing system to access a user profile database comprising a plurality of user profiles, each user profile comprising a pre-selected set of preferred languages, automatically generate the language identification vector for each user profile, wherein the one or more target languages is the pre-selected set of preferred languages, detect a user identity, and automatically retrieve the language identification vector corresponding to the user identity to be included in the user input.

Additionally, or alternatively, prior to receiving the user input, the computing system is configured to present an interface configured to receive any user input that identifies a particular combination of languages that the configurable multilingual model should be configured to recognize. Thus, the computing system is configured to receive user input at the interface configured to receive any user input that identifies the particular combination of languages that the configurable multilingual model is configurable to recognize. The user input is interpretable by the interface as either (i) the null value corresponding to no language being identified from the user input, or alternatively, (ii) the language identification vector corresponding to the particular combination of languages.

Attention will now be directed to FIG. 13, in some reference to FIG. 4, which illustrates a flow diagram 1300 that includes various acts (act 1310, act 1320, and act 1330) associated with exemplary methods that can be implemented by computing system 110 for using a user-specific automatic speech recognition model (e.g., user-specific model 404) to process new user audio data (e.g., new audio data 402) to generate a new transcript (e.g., new transcript 412). The computing system obtains a user-specific automatic speech recognition model comprising a universal automatic speech recognition module (e.g., module 406) and one or more language-specific automatic speech recognition modules (e.g., Language A ASR (module 408) and Language C ASR (module 410)) that are trained to recognize spoken utterances in one or more user-identified languages (e.g., Language A associated with new audio data 402) (act 1310).

The user-specific automatic speech recognition model is generated by a configurable multilingual model that comprises the universal automatic speech recognition module and a plurality of language-specific automatic speech recognition modules, wherein the one or more language-specific automatic speech recognition modules are selected from the plurality of language-specific automatic speech recognition modules based on the one or more user-identified languages. Subsequently, the computing system applies new speech data associated with a particular user to the user-specific automatic speech recognition model (act 1320), and generates a transcript based on the new speech data that is applied to the user-specific automatic speech recognition model (act 1330).

Wherein the new speech data comprises utterances in a first language, the computing system is further configurable to select a particular language-specific automatic speech recognition module from the one or more language-specific automatic speech recognition modules to use for generating the transcript, wherein the particular language-specific automatic speech recognition module corresponding to the first language.

It is noted that the new speech data comprises utterances in a plurality of languages and, the user-specific model comprises multiple language-specific automatic speech recognition modules, and the one or more computer-readable instructions are further executable to further configure the computing system to selectively switch between the multiple language-specific automatic speech recognition modules included in the user-specific model to generate the transcript. In such configurations, each language-specific automatic speech recognition module of the multiple language-specific automatic speech recognition modules included in the user-specific model correspond to a different language included in the plurality of languages associated with the new speech data.

When performing code-switching ASR tasks, during runtime, the computing system is further configurable to selectively switch between the one or more language-specific automatic speech recognition modules to generate the transcript, wherein each language-specific automatic speech recognition module corresponding a different language included in the plurality of languages.

Prior to obtaining the user-specific automatic speech recognition model, the computing system is configured to download instructions from a server that are executable by the computing system to generate the user-specific automatic speech recognition model from the configurable multilingual model.

Wherein the plurality of language-specific automatic speech recognition modules included in the configurable multilingual model corresponds to a plurality of module languages, each language-specific automatic speech recognition module included in the configurable multilingual model is trained to recognize spoken utterances in a different module language of the plurality of module languages. Additionally, the universal automatic speech recognition module is trained to recognize spoken utterances in each language included in the plurality of module languages.

In view of the foregoing, it will be appreciated that the disclosed embodiments provide many technical benefits over conventional systems and methods for building, training, and utilizing machine learning models for multilingual speech recognition. The disclosed embodiments beneficially improve conventional techniques by providing a single machine learning model (e.g., a configurable multilingual model) that is configurable at inference time to recognize speech in any combination of user-selected languages.

Furthermore, although the foregoing subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1A) that store computer-executable instructions (e.g., computer-readable instructions 118 of FIG. 1A) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1A) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more hardware storage devices storing one or more computer-readable instructions that are executable by the one or more processors to configure the computing system to at least:
   obtain a plurality of language-specific automatic speech recognition modules, each language-specific automatic speech recognition module of the plurality of language-specific automatic speech recognition modules having been trained on a different language-specific training dataset and such that each of the plurality of language-specific automatic speech recognition modules is configured to recognize speech in a correspondingly different language of a plurality of different languages;
   obtain a universal automatic speech recognition module trained on a multi-language training dataset comprising training data corresponding to each of the plurality of different languages and such that the universal automatic speech recognition module is trained to recognize speech in all of the plurality of different languages;
   compile the universal automatic speech recognition module with the plurality of language-specific automatic speech recognition modules as a configurable multilingual model that is configured to selectively and dynamically utilize a sub-set of the plurality of language-specific automatic speech recognition modules with the universal automatic speech recognition module to process audio content in response to user input identifying one or more target languages associated with the audio content; and training the configurable multilingual model to recognize user input for selecting combinations of the plurality of different languages when configuring the configurable multilingual model into a user-specific automatic speech recognition model by providing the configurable multilingual model with user choice input vectors corresponding to different combinations of the plurality of different languages.

2. The computing system of claim 1, the one or more computer-readable instructions being further executable to further configure the computing system to:
obtain a one-hot vector corresponding to a first language;
obtain a multi-hot vector corresponding the first language and one or more additional languages; and
randomly present the one-hot vector and the multi-hot vector as the user choice input vectors to the configurable multilingual model during training of the configurable multilingual model.

3. The computing system of claim 2, the one or more computer-readable instructions being further executable to further configure the computing system to:
apply a language-independent training dataset without language identification data.

4. The computing system of claim 2, as a result of compiling the configurable multilingual model, the configurable multilingual model comprises a language-specific embedding based on the multi-hot vector and an input acoustic feature, a language-specific layer comprising the universal automatic speech recognition module and the plurality of language-specific automatic speech recognition modules, and a language-specific vocabulary that merges one or more language-specific vocabularies in response to user input interpretable for selecting one or more languages, each language corresponding to a different language-specific vocabulary dataset.

5. A computing system comprising:
one or more processors; and
one or more hardware storage devices storing one or more computer-readable instructions that are executable by the one or more processors to configure the computing system to at least:
obtain a configurable multilingual model comprising a universal automatic speech recognition module and a plurality of language-specific automatic speech recognition modules, the configurable multilingual model being trained to dynamically select the universal automatic speech recognition module and a sub-set of language-specific automatic speech recognition modules from the plurality of language-specific automatic speech recognition modules to generate a user-specific automatic speech recognition model configured to recognize spoken utterances in one or more user-identified languages;
receive user input comprising (i) a null value corresponding to the universal automatic speech recognition module or (ii) a language identification vector indicating one or more target languages;
select the universal automatic speech recognition module; and
when the user input comprises the language identification vector, select the sub-set of language-specific automatic speech recognition modules, each language-specific automatic speech recognition modules included in the sub-set of language-specific automatic speech recognition modules trained to recognize spoken utterances in a different language of the one or more target languages.

6. The computing system of claim 5, the one or more computer-readable instructions being further executable to further configure the computing system to:
extract the universal automatic speech recognition module and the sub-set of language-specific automatic speech recognition modules from the configurable multilingual model; and
at inference time, generate the user-specific automatic speech recognition model by combining the universal automatic speech recognition module and the sub-set of language-specific automatic speech recognition modules.

7. The computing system of claim 6, the one or more computer-readable instructions being further executable to further configure the computing system to:
transmit the user-specific automatic speech recognition model to a user device.

8. The computing system of claim 5, the one or more computer-readable instructions being further executable to further configure the computing system to compile the configurable multilingual model by:
identifying one or more module languages;
obtaining one or more language-specific automatic speech recognition modules, each language-specific automatic speech recognition module of the one or more language-specific automatic speech recognition modules trained on a different language-specific training dataset to train each language-specific automatic speech recognition module to recognize spoken utterances in a different language of the one or more module languages;
obtaining a universal automatic speech recognition module trained on a multi-language training dataset comprising training data corresponding to each of the one or more module languages to train the universal automatic speech recognition module to recognize spoken utterances in any of the one or more module languages; and
combining the universal automatic speech recognition module and the one or more language-specific automatic speech recognition modules.

9. The computing system of claim 5, the language identification vector comprising a one-hot vector corresponding a single target language.

10. The computing system of claim 5, the language identification vector comprising a multi-hot vector corresponding to a plurality of target languages.

11. The computing system of claim 5, the one or more computer-readable instructions being further executable to further configure the computing system to select the sub-set of language-specific automatic speech recognition modules by:
positively weighting each language-specific automatic speech recognition module included in the sub-set of language-specific automatic speech recognition modules; and unweighting each language-specific automatic speech recognition module not included in the sub-set of language-specific automatic speech recognition modules.

12. The computing system of claim 5, the one or more computer-readable instructions being further executable to further configure the computing system to:
when the user input comprises the null value, unweight each language-specific automatic speech recognition module included in the plurality of language-specific automatic speech recognition modules such that the sub-set of language-specific automatic speech recognition modules is an empty sub-set.

13. The computing system of claim 5, the one or more computer-readable instructions being further executable to further configure the computing system to:
generate a set of executable instructions configured to be transmitted to and executed by a client computing system to cause the client computing system to compile the configurable multilingual model by:
obtaining the plurality of language-specific automatic speech recognition modules, each language-specific automatic speech recognition module of the plurality of language-specific automatic speech recognition modules having been trained on a different language-specific training dataset and such that each of the plurality of language-specific automatic speech recognition modules is configured to recognize speech in a correspondingly different language of a plurality of different languages;
obtaining the universal automatic speech recognition module trained on a multi-language training dataset comprising training data corresponding to each of the plurality of different languages and such that the universal automatic speech recognition module is trained to recognize speech in all of the plurality of different languages; and
compiling the universal automatic speech recognition module with the plurality of language-specific automatic speech recognition modules to generate a configurable multilingual model that is configured to selectively and dynamically utilize a sub-set of the plurality of language-specific automatic speech recognition modules with the universal automatic speech recognition module to process audio content in response to user input identifying one or more target languages associated with the audio content.

14. The computing system of claim 5, the one or more computer-readable instructions being further executable to further configure the computing system to:
access a user profile database comprising a plurality of user profiles, each user profile comprising a pre-selected set of preferred languages;
automatically generate the language identification vector for each user profile, wherein the one or more target languages is the pre-selected set of preferred languages;
detect a user identity; and
automatically retrieve the language identification vector corresponding to the user identity to be included in the user input.

15. The computing system of claim 5, the one or more computer-readable instructions being further executable to further configure the computing system to:
receive the user input at an interface, the user input being interpretable by the interface as either (i) the null value corresponding to no language being identified from the user input, or alternatively, (ii) the language identification vector corresponding to the particular combination of languages.

16. The computing system of claim 5, wherein the one or more computer-readable instructions are further executable by the one or more processors to configure the computing system to at least:
apply new speech data associated with a particular user to the user-specific automatic speech recognition model; and
generate a transcript based on the new speech data being applied to the user-specific automatic speech recognition model.

17. The computing system of claim 16, wherein the new speech data comprises utterances in a first language, and the one or more computer-readable instructions being further executable to further configure the computing system to:
select a particular language-specific automatic speech recognition module from the one or more language-specific automatic speech recognition modules to use for generating the transcript, the particular language-specific automatic speech recognition module corresponding to the first language.

18. The computing system of claim 16, wherein the new speech data comprises utterances in a plurality of languages, and the one or more computer-readable instructions being further executable to further configure the computing system to:
selectively switch between the one or more selected language-specific automatic speech recognition modules to generate the transcript, each language-specific automatic speech recognition module corresponding a different language included in the plurality of languages.

19. The computing system of claim 16, the one or more computer-readable instructions being further executable to further configure the computing system to:
download instructions from a server that are executable by the computing system to generate the user-specific automatic speech recognition model from the configurable multilingual model.

20. The computing system of claim 16, wherein the universal automatic speech recognition module is trained to recognize spoken utterances in each language included in the plurality of module languages.

* * * * *